United States Patent Office 3,522,246
Patented July 28, 1970

3,522,246
FIBER REACTIVE QUINOXALINE
TYPE DYESTUFFS
Edgar Siegel, Leverkusen, and Klaus Sasse, Cologne-Stammheim, Germany, assignors to Farbenfabriken Bayer, Aktiengesellschaft, Leverkusen, Germany, a corporation of Germany
No Drawing. Application Dec. 11, 1964, Ser. No. 417,831, now Patent No. 3,377,336, dated Apr. 9, 1968, which is a continuation-in-part of application Ser. No. 171,269, Feb. 5, 1962. Divided and this application Oct. 24, 1967, Ser. No. 677,776
Int. Cl. C07d 51/78
U.S. Cl. 260—242          10 Claims

ABSTRACT OF THE DISCLOSURE

Fiber reactive dyestuffs for use on cellulose containing textile materials having the formula

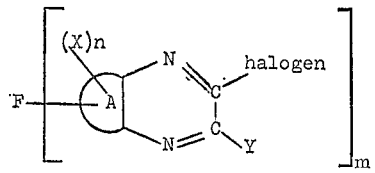

wherein F is the radical of an organic dyestuff, A is a five- or six-membered isocyclic or heterocyclic ring, X is hydrogen or an organic substitutent, Y is hydrogen, halogen or an organic radical, "halogen" is a halogen atom, $m$ a whole number and $n$ a whole number from 1 to 3.

CROSS REFERENCE TO RELATED APPLICATIONS

This application is a divisional of application Ser. No. 417,831 filed Dec. 11, 1964, now U.S. Pat. No. 3,377,-336 which application Ser. No. 417,831 is in turn, a continuation-in-part of application Ser. No. 171,269 filed Feb. 5, 1962, now abandoned.

The present invention relates to novel and valuable dyestuffs; more particularly it relates to dyestuffs of the general formula

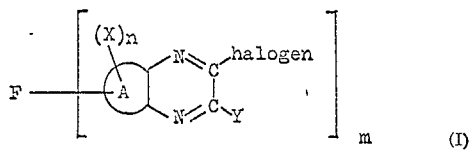

In this Formula F denotes the radical of an organic dyestuff, A means a five- or six-membered isocyclic or heterocyclic ring, X denotes hydrogen or an organic substituent, Y means hydrogen, halogen or an organic radical, "halogen" means a halogen atom, $m$ a whole number and $n$ a whole number from 1 to 3.

It is an object of this invention to provide new valuable dyestuffs and processes for their manufacture; another object is the provision of new fibre reactive dyestuffs which are particularly useful for the dyeing and printing of cellulose-containing textile materials. A further object is the provision of new dyestuffs which exhibit outstanding wet fastness properties when dyes or printed on OH-group containing materials according to methods known for fibre reactive dyestuffs. Still another object is the provision of a method for dyeing textile materials, particularly cellulose-containing textile fibres with the novel fibre reactive dyestuffs. It is also an object of the invention to provide textile materials, particularly cellulose-containing fibres which are dyed and printed very fast to wet processing and which posses excellent general fastness properties. Other objects will become evident from the following description.

The dyestuffs of Formula I may belong to a great variety of classes, for example to the series of metal-free or metal-containing mono- or polyazo dyestuffs, metal-free or metal-containing azaporphine dyestuffs, preferably phthalocyanine dyestuffs, anthraquinone, nitro, oxazine, dioxazine, triphenylmethane, azomethine, benzanthrone and dibenzanthrone dyestuffs as well as polycyclic condensation compounds of the latter.

In the dyestuffs of the general Formula I the radical

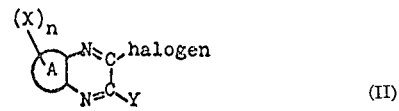

can be linked with the dyestuff molecule either directly or via optional bridge members. As bridge members there are to be mentioned for example sulfonamide, sulfonylamino, carbonamide, carbonylamino, alkylene, aralkylene, arylene, amino, alkyleneamino, aralkyleneamino, aryleneamino groups, amino groups which may be substituted by alkyl, aryl, aralkyl or acyl groups, bisacylimide groups such as bis-sulfonylamide groups and sulfonyl-carboxylimide or sulfonyl-triazinyl or -pyrimidinyl groups, further urea and urethane groupings, heterocyclic ring systems such as triazinylamino and pyrimidinylamino radicals which may also exhibit reactive halogen atoms, as well as oxygen and sulfur atoms and the azo grouping.

The bridge member may connect the radical F with the ring system A either via two or via three linking positions whereby in the latter case, for instances a 5- or 6-membered ring which is condensed with the nucleus A and which contains exchangeable halogen atoms (e.g. a compound of Formula IV) may be reacted with amino group-containing dyestuffs.

As substituents X there are to be considered inter alia: optionally substituted alkyl, aralkyl and aryl radicals, sulfonic acid, carboxylic acid, halogen substituents, such as chlorine and bromine substituents, further nitro, hydroxy, alkoxy, cyano, sulfone and optionally substituted sulfonamide groups, acid ester groupings such as sulfonic acid and carboxylic acid ester groups and the like. Among the halogen substituents in the pyrazine radical, chlorine and bromine substituents are of special interest. In the case where Y represents an organic radical, the latter may be of any desired type, for example an optionally substituted alkyl group, an alkylamino-, aralkylamino-, arylamino- or acylamino group, an alkyl- or aryl-sulfonyl-amino group, further radicals of aliphatic and aromatic hydroxy or mercapto compounds. Of course, Y may also stand for the radical of a coloured component, that is to say of any desired dyestuff.

The new dyestuffs of the Formula I may be water-soluble or also barely or even insoluble in water, depending on the type of their substituents. The radical F may contain the substituents customary for the dyestuffs present in each case, such as sulfonic acid, carboxylic acid, optionally substituted sulfonamide, sulfone, alkylamino, aralkylamino, arylamino, acylamino, nitro, cyano, halogeno, hydroxy, alkoxy, azo groupings and the like. The dyestuffs may moreover contain further groupings capable of fixation such as mono- or di-halotriazinylamino, mono-, di- or tri-halopyrimidinylamino, esterified sulfonic acid hydroxyalkylamide and esterified hydroxy alkylsulfone groups, vinyl sulfone, sulfofluoride, haloalkylamino and haloacylamino, epoxide, urethane, unsaturated haloalkylurethane, isocyanate, isothiocyanate groups and the like.

The new dyestuffs can be built up according to a variety of principles of preparation. For example, dyestuffs or dyestuff intermediates containing amino or amide groups and having a reactive hydrogen atom at the amine or amide nitrogen, can be reacted with compounds of the general Formula II which contain a reactive grouping, for example a carboxylic acid halide, sulfonic acid halide or isocyanate grouping, in the 5- or 6-membered aromatic or heterocyclic nucleus A, and if dyestuff intermediates are used, the latter can be converted in a suitable manner into the desired final dyestuffs. In the opposite case dyestuffs or dyestuff intermediates which contain reactive groupings, for example in the form of sulfonic acid halide, carboxylic acid halide, urethane, ester, haloalkyl and similar groupings, can be reacted with those compounds of the Formula II which contain in the aromatic or heterocyclic nucleus A an amino or amide group with replaceable hydrogen and, insofar as dyestuff intermediates are used, the latter can again be converted into the desired final dyestuffs. In the case of production of azo group-containing dyestuffs, it is also possible to use such compounds of the general Formula II which are substituted in the nucleus A by a diazotizable amino group, to diazotize these components and to couple them in conventional manner with any desired coupling component and using them in this way for building up mono- or polyazo dyestuffs.

When principles other than those described above are applied, for example with the formation of oxygen, sulfur or acid ester groupings, a number of further dyestuffs of the general Formula I are obtained according to equally well-known methods. Dyestuffs in which the radical of the Formula II is directly linked with F can be built up in the series of azo compounds for example by diazotizing an aminoaryl compound which contains the aryl nucleus directly linked with the 5- or 6-membered nucleus A of the compound of the general Formula II via a carbon-carbon bond, and possibly coupling with azo components.

Depending upon the number of appropriate groupings in the dyestuff radical or dyestuff intermediates to be considered for the conversion, one or more groupings of the general Formula II can be incorporated in the dyestuffs. In the majority of cases, the letter *m* will not exceed 4, but it is also possible to synthesize dyestuffs with more than 4, for example with up to 8 groupings of the Formula II, especially those of high molecular structure.

Some of the intermediate products of the Formula II are known from literature (c.f. e.g. Angewandte Chemie [1960], 72, page 973). From these some of the products suitable for the preparation of the final dyestuffs or dyestuff intermediates can be synthesized by subsequent introduction of the appropriate groupings, for example by sulfochlorination. In general, it is however advantageous to introduce the desired groups, for example carboxylic acid or carboxylic acid chloride, nitro, amino, amido or acylamino groups, into the nucleus A of the o-arylenediamino compound already before the ring closure to form the pyrazine ring. In this case, the process starts, for example, from a 1,2-diamino-benzoic acid, -sulfonic acid or a triaminobenzene compound (with at least two o-positioned amino groups) or from a derivative which is acylated or substituted at an amino group which shall not take part in ring closure, this compound is reacted with oxalic acid with the formation of a quinoxaline ring and the free hydroxy groups are converted into halogen substituents, if desired after conversion of the substituent contained in the nucleus A, in the case of a nitro group, for example, after reduction. Sometimes it is also possible to combine the conversion of the hydroxyl groups into halogen atoms in one step with a possibly desirable conversion of a substituent contained in the nucleus A, for example an amino group, for example by converting the amino group-containing dihydroxy compound with phosgene in the presence of dimethylformamide into the corresponding isocyanate group-containing dihalogeno compound. In the intermediate products or after formation of the dyestuffs of the formula

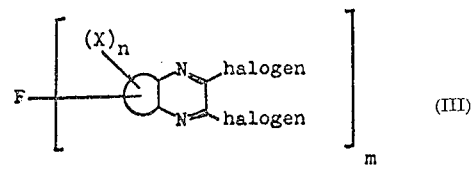

one of the two halogen substituents in the pyrazine ring can be converted into the radical of an organic compound by reacting it for example with aliphatic, aromatic or heterocyclic amino, hydroxy or mercapto compounds.

Among the great number of dyestuffs obtainable according to this process those products are especially easily obtained which are derived from amino group-containing azo dyestuffs of the benzene-azo-benzene, benzene - azo-naphthalene, naphthalene-azo-naphthalene, benzene-azo-aminopyrazole and -pyrazolone series and of the hetero-azo-aryl series and the aminoanthraquinone series with nuclear-positioned and/or externally linked amino groups, by the reaction with compounds of the Formula II which contain in the 5- or 6-membered nucleus A a reactive grouping, for example a carboxylic acid chloride sulfonic acid chloride, isocyante, urethane, halotriazinylamino, halopyrimidinylamino or also a dichloroquinoxalinoyl or dichloroquinoxalinoyl-methylene group. Likewise, an amino group-containing dyestuff or dyestuff intermediate can be combined in a simple manner with a dichloroquinoxaline containing an amino group in the nucleus A, by means of polyfunctional acylating agents, for example by reacting the amino group-containing starting components with phosgene, aliphatic or aromatic dicarboxylic acid halides, cyanuric halides or di-, tri- or tetra-halopyrimidine.

A special case of linking the radical of the Formula II with the dyestuff is attained by starting from a dihalo-quinoxaline derivative with a condensed dihalo-pyrazine ring, having for example the formula

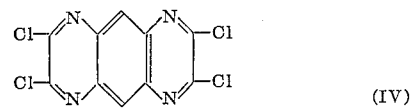

and condensing in this compound at least one of the reactive halogen atoms with an amino group-containing dyestuff or dyestuff intermediate.

It will be understood that a great number of other starting components can be used in the preparation of the novel dyestuffs.

The new dyestuffs are valuable products which are excellently suitable for various purposes of application. As water-soluble compounds they are of special interest for the dyeing of nitrogen-containing and hydroxyl group-containing textile materials, especially of native and regenerated cellulose, wool, silk, synthetic polyamide and polyurethane fibres. On account of the reactive halogen substituents in the pyrazine radical, the products are particularly suitable as reactive dyestuffs for the dyeing of cellulose materials according to the techniques known for this purpose.

For the dyeing of natural and regenerated cellulose the dyestuffs are preferably used in an aqueous solution which may be treated with substances having an alkaline reaction such as alkali metal hydroxide or alkali metal carbonate or with compounds convertible into substances of alkaline reaction such as alkali metal bicarbonate. Further auxiliaries may be added to the solution but they should not react with the dyestuffs in an undesirable manner. Additives of this kind are for example surface-active substances such as alkyl sulfates, substances preventing migration of the dyestuff, dyeing adjuvants such as urea which is to improve the solubility and fixation of the dyestuff, or inert thickening agents such as oil-in-water emulsions, tragacanth, starch, alginate or methyl cellulose.

The solutions or pastes thus prepared are applied to the material to be colored, for example by padding on the foulard (short bath) or by printing, and subsequently heated to an elevated temperature, preferably 40–150° C., for some time. Heating can be effected in the hot flue, in a steaming apparatus, on heated rollers or by introduction into heated concentrated salt baths.

When using a padding or dyeing liquor without alkali the colored dry material is subsequently passed through an alkaline solution to which sodium chloride or Glauber's salt are added. The addition of salt prevents migration of the dyestuff from the fibre.

The material to be dyed can also be pre-treated with one of the aforesaid acid-binding agents, subsequently treated with a solution or paste of the dyestuff and, finally, fixed at an elevated temperature as described above.

In the so-called cold pad batch process, the subsequent heating of the padded fabric can be dispensed with by storing the fabric at room temperature for 4–20 hours. In this process sodium carbonate solution is preferably used as alkali.

For dyeing from a long liquor, the material is introduced into an aqueous solution of the dyestuff (goods-to-liquor ratio 1:5 to 1:40) at room temperature and dyed, if desired while raising the temperature up to 85° C. for 40–90 minutes with the addition in portions of salt, for example sodium sulfate, and subsequently of alkaline substances for example sodium phosphates, sodium carbonate or alkalies.

After fixation the dyed material is rinsed hot and, if required, finally soaped, thereby removing insufficiently fixed dyestuff residues. Dyeings of excellent fastness to wet processing are thus obtained.

For printing materials containing hydroxyl groups, a printing paste is used consisting of the dyestuff solution, a thickening agent, such as sodium alginate, and a compound having alkaline reaction or dissociating alkali on heating, such as sodium carbonate, sodium phosphate, potassium carbonate, potassium acetate or sodium and potassium bicarbonate, the printed material is rinsed and, if desired, finally soaped.

When the dyestuffs, in particular azo dyestuffs, contain groupings forming metal complexes, the fastness properties of the dyeings and prints can in many cases be improved by an after-treatment with metal-yielding agents such as copper salts, for example copper sulfate; chromium, cobalt and nickel salts such as chromium acetate, cobalt sulfate or nickel sulfate.

Textile materials containing amide groups such as wool, silk, synthetic polyamide and polyurethane fibres are in general dyed in the acidic to neutral range according to the dyeing methods conventionally used for this purpose whereby a final increase of the pH value of the dyebath to, for example pH 6.5 to 8.5 is sometime of advantage.

The dyestuffs are applied to a synthetic polyamide fabric, for example, as solutions or, preferably, in dispersed form and subsequently after-treated together with acid-binding agents in preferably small amounts, such as sodium carbonate. Especially advantageous results are achieved with dyestuffs which are insoluble or barely soluble in water. These are worked up according to conventional techniques and with the addition of known auxiliaries into a dyestuff dispersion and used as such in the dye- or padding-liquor or in a printing paste. Auxiliaries suitable for this application are inter alia compounds preventing the migration of the dyestuff on the fibre such as cellulose ether, alkali metal chlorides and sulfates; wetting agents such as condensation products from ethylene oxide and fatty alcohols or phenols, sulfonated fatty alcohols, solvents such as thiodiglycol; further thickeners such as starch, tragacanth, alginate thickening, gum arabic etc.

After-treatment of the dyeings impregnations and prints obtained on polyamide fibre fabrics is preferably carried out at a temperature of 50–110° C. for 5–60 minutes. In the case where the dyestuffs employed contain groupings forming metal complexes, the fastness properties of the dyeings will sometimes be improved by treating the dyeings with metal-yielding agents such as copper salts, for example copper sulfate, or chromium, cobalt and nickel salts such as chromium acetate, cobalt sulfate or nickel sulfate.

The dyeings and prints obtainable with the dyestuffs on cellulosic material are, in general, distinguished by good to very good fastness properties, especially by excellent fastness to wet processing, such as to washing to boiling soda and furthermore to water, to rubbing and brushing, to light and in some instances to chlorine and to peroxide. The dyeings and prints on woollen fabrics possess very good fastness to washing, milling, sea-water, hot water and to light. Dyeings and prints on synthetic polyamide fabrics are distinguished by very good fastness to water, washing and light whereas dyeings and prints on synthetic polyester materials, particularly on polyethylene terephthalate, exhibit good fastness to sublimation, to washing and to light.

The following examples are given for the purpose of illustrating the invention, the parts being parts by weight if not otherwise stated.

Example 1

28 parts by volume of concentrated hydrochloric acid are added to a solution of 34.7 parts of 2-aminonaphthalene-4,8-disulphonic acid sodium salt and 7 parts of sodium nitrite in 300 parts of water while cooling with ice, and the mixture is stirred at 0–10° C. for ½ hour. After removal of excess nitrous acid, 10.7 parts of 3-aminotoluene dissolved in 10 parts by volume of concentrated hydrochloric acid and 150 parts of water are added and coupling is completed by adjusting the hydrochloric acid solution to pH 3–5. The resultant aminoazo dyestuff is salted out, filtered off with suction, washed and then re-dissolved in 700 parts of water at pH 7 with the addition of sodium hydroxide solution. The aqueous solution is then treated with 26.5 parts of 2,3-dichloro-quinoxaline-6-carboxylic acid chloride (M.P. 116° C., B.P. 144° C./0.05 mm. Hg) dissolved in 100 parts of benzene and vigorously stirred. By the reaction now setting in the mixture warms up to 35–40° C.; the hydrochloric acid set free is neutralised with sodium carbonate solution until a free amino group can no longer be detected. The resulting dyestuff of the formula

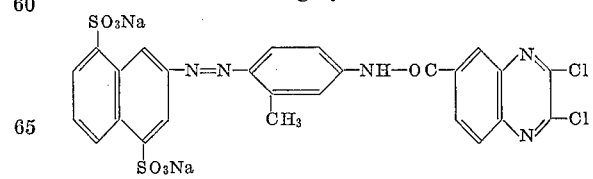

is salted out with 80 parts of sodium chloride, pressed off, washed and dried at 40–50° C. under vacuum. It is a yellow powder which dissolves in water with a yellow colour.

When a cellulose fabric is printed with a printing paste containing per kilogram 15 grams of the dyestuff, 100 g. of urea, 300 ml. of water, 500 g. of alginate thickening (60 g. of sodium alginate per kg. of thickening), 2 g. of sodium hydroxide and 10 g. of sodium carbonate, and made up to 1 kg. with water, then dried, steamed at 105° C. for 8 minutes, rinsed with hot water and boiled with soap, an intense reddish yellow print of good fastness to washing and light is obtained.

Example 2

When 46 parts of the amino-monoazo dyestuff of Example 1 are stirred in an aqueous solution with a solution of 24 parts of 2,3-dichloroquinoxaline-6-isocyanate in benzene at pH 7–7.5 (phosphate buffer), until a free amino group can no longer be detected, there is obtained after salting out, pressing off and drying, a yellow dyestuff of the formula

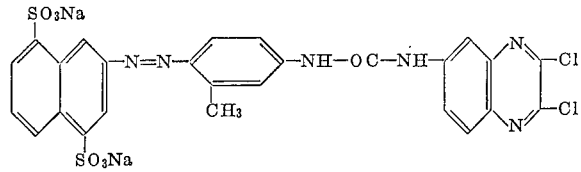

with which a cotton fabric can be dyed from a long bath in reddish yellow shades fast to washing and light, in the following manner:

50 g. of cotton skein are dyed in 1 litre of a dyebath containing 1.5 g. of the above dyestuff by raising the temperature from 20° C. to 80° C. within 30 minutes while adding a total of 50 g. of sodium chloride in several portions, subsequently adding 20 g. of trisodium phosphate and treating at this temperature for 60 minutes. After rinsing, boiling with soap and drying there is obtained a reddish yellow dyeing of good fastness to wet processing, rubbing and light.

Example 3

46 parts of the monoazo dyestuff obtained analogously to the instructions of Example 1 by coupling diazotized 2-aminonaphthalene-4,8-disulphonic acid with 3-methylamino-toluene are dissolved in 300 parts of water of 50° C. at pH 7–8, treated in the presence of an excess of sodium acetate or calcium carbonate at 50–70° C. with portions of a total of 30–35 parts of finely powdered 2,3-dichloroquinoxaline-6-sulphochloride of M.P. 86–87° C., and stirred at this temperature, until a sample no longer shows a change of colour upon acidification. The resulting dyestuff of the formula

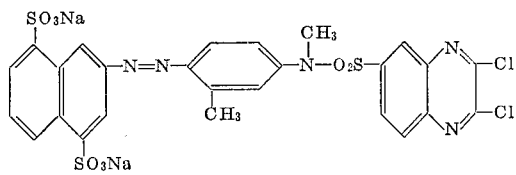

is salted out, filtered off with suction, washed and dried.

A cotton fabric is impregnated with a solution of 20–25° C. containing per litre of liquor 20 g. of the above dyestuff and 0.5 g. of a non-ionogenic wetting agent (e.g. a polyethoxylated oleyl alcohol) as well as 150 g. of urea and 15 g. of sodium bicarbonate. Subsequently the fabric is squeezed off between two rubber rollers to a moisture content of about 100%. After intermediate drying at 50–60° C., the fabric is heated to 140° C. for 10 minutes and the dyeing thus obtained thoroughly rinsed with hot water and treated at the boil for 20 minutes with a solution containing per litre 5 g. of Marseille soap and 2 g. of sodium carbonate. After rinsing and drying, there is obtained an intense reddish yellow dyeing of good fastness to wet processing, rubbing and light.

In the following table there are listed the diazo components, coupling components and reactive components which can be linked with the amino group, from which components dyestuffs can be synthesized in analogy to the instructions of Examples 1–3; their shades—obtained according to one of the methods of application described above—are likewise listed in the table.

Abbreviations for the reactive components:
A = 2,3-dichlorquinoxaline-6-carboxylic acid chloride.
B = 2,3-dichlorquinoxaline-6-isocyanate.
C = 2,3-dichlorquinoxaline-6-sulphochloride.

| Example No. | Diazo components | Coupling components | Reactive components | Shade |
|---|---|---|---|---|
| 4 | 2-aminonaphthalene-4,8-disulphonic acid | 1-amino-2-methoxy-5-methylbenzol | A | Yellow. |
| 5 | do | do | B | Do. |
| 6 | 1-aminonaphthalene-3,6-disulphonic acid | 1-amino-3-methylbenzene | A | Do. |
| 7 | do | do | B | Do. |
| 8 | 2-aminonaphthalene-5,7-disulphonic acid | do | A | Do. |
| 9 | do | do | B | Do. |
| 10 | 2-aminonaphthalene-6,8-disulphonic acid | do | A | Do. |
| 11 | do | do | B | Do. |
| 12 | 4-aminoazobenzene-3,4'-disulphonic acid | do | A | Brown-yellow |
| 13 | 1-aminobenzene-4-sulphonic acid ⟶ 1-aminonaphthalene-6-sulphonic acid | do | B | Do. |
| 14 | 2-(3'-sulpho-4'-aminophenyl)-6-methyl-benzthiazole-7-sulphonic acid | do | A | Yellow. |
| 15 | 2-aminonaphthalene-4,8-disulphonic acid | 1-methylamino-3-methoxybenzene | C | Do. |
| 16 | do | 1-amino-3-acetylaminobenzene | A | Do. |
| 17 | do | Aniline | A | Do. |

Example 18

Into a solution of 36.5 parts of the sodium salt of 1-amino-8-hydroxynaphthalene-3,6-disulphonic acid in 100 parts of water there are introduced with good stirring 26.5 parts of finely powdered 2,3-dichloroquinoxaline-6-carboxylic acid chloride, and the mixture is stirred while continuously neutralising the hydrochloric acid set free to pH 6–7, until a free amino group can no longer be detected. The dyestuff intermediate thus obtained crystallises in yellowish small needles and after dilution with 600 parts of water and addition of 12 parts of sodium carbonate, it is coupled at 5–10° C. with 17.5 parts of diazotized 2-aminobenzene-sulphonic acid dissolved in 200 parts of water. The dyestuff formed at a final pH of about 7 and having the formula

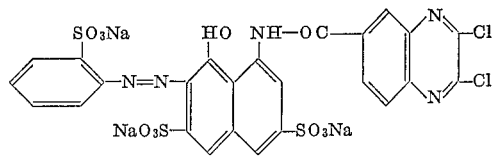

is salted out with 100 parts of sodium chloride, filtered off with suction, washed and dried at 40–50° C. in a vacuum. The dyestuff forms small red needles which have a metallic lustre and easily dissolve in water with a red colour.

By dyeing or printing a fabric of cotton or regenerated cellulose with this dyestuff according to one of the methods described in Examples 1–3, there are obtained clear bluish red dyeings and prints of good fastness to wet processing, rubbing and light.

Similar results are also obtained by proceeding according to the method of application of Example 2, but carrying out the addition of salt and the one-hour after-treatment with trisodium phosphate not at 80° C., but at room temperature (20–30° C.). This is also true of the method of Example 3 according to which there are likewise obtainable red dyeings with the fastness properties mentioned above when using 20 g. of sodium carbonate or 10 ml. of sodium hydroxide solution, 38° Bé., instead of the 15 g. of sodium bicarbonate there employed, and storing the cellulose fabric squeezed to a moisture content of 100% at room temperature for 20 hours instead of intermediately drying and heating to 140° C.

In the following table there are given the shades of further dyestuffs which are synthesized from the below listed diazo components, coupling components and reactive components capable of being linked with free amino groups in the coupling components, analogously to the instructions of Example 18, or also by reaction of the corresponding aminoazo dyestuffs with the reactive components; the fibre reactive dyestuffs can be dyed or printed on cellulose-containing materials according to one of the processes described above:

of sodium carbonate in 200 parts of water, whereupon coupling takes place to give the dyestuff of the formula

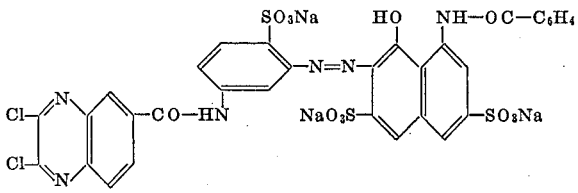

which is salted out, filtered off with suction, washed and dried under vacuum at 40–50° C. The dyestuff readily dissolves in water with a red colour and yields clear bluish red dyeings and prints on cellulose material according to one of the processes described above.

When a fabric of synthetic polyamide fibres is dyed by boiling, in a goods-to-liquor ratio of 1:30, in a bath containing 2% of the dyestuff mentioned above (referred to the weight of the material to be dyed), a clear bluish red dyeing of good fastness to wet processing is obtained after rinsing.

ABBREVIATIONS FOR THE REACTIVE COMPONENTS AS IN TABLE TO EXAMPLE 3

| Example No. | Diazo components | Coupling components | Reactive components | Shade |
| --- | --- | --- | --- | --- |
| 19 | 1-aminobenzene-2-sulphonic acid | 1-amino-8-hydroxynaphthalene-3,6-disulphonic acid | B | Red. |
| 20 | do | 1-(3'-aminobenzoylamino)-8-hydroxynaphthalene-3,6-disulphonic acid. | A | Red. |
| 21 | do | do | B | Red. |
| 22 | 1-amino-2-carboxybenzene-4-sulphonic acid | 1-amino-8-hydroxynaphthene-3,6-disulphonic acid | A | Red. |
| 23 | 1-amino-4-methylbenzene-2-sulphonic acid | do | A | Red. |
| 24 | 1-amino-3-acetylamino-benzene-6-sulphonic acid | do | B | Red. |
| 25 | 1-amino-3-(2'-[4''-sulphophenylamino]-4'-chlortriazine-1', 3',5'-yl-6'-)-aminobenzene-6-sulphonic acid. | do | A | Red. |
| 26 | 1-aminobenzene-2-sulphonic acid | 2-amino-5-hydroxynapthalene-7-sulphonic acid | A | Orange. |
| 26a | 1-amino-3-(2'-[4''-sulphophenylamino]-4'-methylamino-triazine-1',3',5'-yl-6')-amino-benzene-6-sulphonic acid. | do | A | Do. |
| 27 | 1-aminobenzene-2-sulphonic acid | 2-methylamino-5-hydroxynapthalene-7-sulphonic acid | C | Do. |
| 28 | 1-amino-4-acetyl-amino-6-sulphonic acid | do | C | Scarlet. |
| 29 | do | 2-amino-5-hydroxynaphthalene-7-sulphonic acid | A | Do. |

Example 30

Into a solution of 21 parts of the sodium salt of 1,3-diaminobenzene-6-sulphonic acid in 100 parts of water there are introduced with good stirring 26.9 parts of finely powdered 2,3-dichloroquinoxaline-6-carboxylic acid chloride and the mixture is stirred at 20–40° C. while continuously neutralising the hydrochloric acid set free to pH 6–7, until a sample, after diazotization and coupling with 1-hydroxynaphthalene-4-sulphonic acid, shows a clear yellowish red colour. After the addition of ice, the resultant dyestuff intermediate is directly diazotized with 7 parts of sodium nitrite and 28 parts of concentrated hydrochloric acid and subsequently combined with a solution of 47 parts of the sodium salt of 1-benzoylamino-8-hydroxynaphthalene-3,6-disulphonic acid and 12 parts The following table gives the shades and the pH value of the coupling medium of dyestuffs which can be produced analogously to the instructions of Example 30 from a diazo component containing a further, preferably acylatable amino group, a coupling component and a reactive component which can be linked with the diazo component. The processes mentioned above can be used for dyeing and printing cellulose materials with these dyestuffs.

ABBREVIATIONS FOR THE REACTIVE COMPONENTS AS IN THE TABLE OF EXAMPLE 3

| Example No. | Diazo components | Coupling components | Reactive components | pH of coupling medium | Shade |
| --- | --- | --- | --- | --- | --- |
| 31 | 1,3-diaminobenzene-4-sulphonic acid | 2-aminonaphthalene-5,7-disulphonic acid | A | 4–5 | Orange. |
| 32 | do | 2-aminonaphthalene-3,6-disulphonic acid | A | 4–5 | Do. |
| 33 | do | 2-aminonaphthalene-6-sulphonic acid | B | 4–5 | Do. |
| 34 | do | 2-N-methylamino-8-hydroxynaphthalene-6-sulphonic acid | A | 4–5 | Do. |
| 35 | do | 1-(2',4'-dichlortriazine-1',3',5',-yl-6'-amino)-8-hydroxynaphthalene-3,6-disulphonic acid. | C | 7–8 | Red. |
| 36 | do | 1-(2',4'-dihydroxytriazine-1',3',5'-yl-6'-amino)-8-hydroxynaphthalene-3,6-disulphonic acid. | B | 7–8 | Red. |
| 37 | do | 1-(2',3'-dichlorquinoxalinoyl-6'-amino)-8-hydroxynaphthalene-3,6-disulphonic acid. | A | 7–8 | Red. |
| 38 | do | 2-hydroxynaphthalene-3,6-disulphonic acid | A | 8 | Scarlet. |
| 39 | do | 1-acetylamino-8-hydroxynaphthalene-3,6-disulphonic acid | B | 7–8 | Red. |
| 40 | do | 1-(3'-sulphophenyl)-3-methyl-pyrazolone-5 | A | 6 | Yellow. |
| 41 | do | 1-(2',5'-dichlor-4'-sulphophenyl)-3-methylpyrazolone-5 | A | 6 | Do. |
| 42 | do | 1-(5',7'-disulphonaphthyl-2'-)-3-methylpyrazolone-5 | A | 6 | Do. |
| 43 | do | 1-(3'-sulphophenyl)-3-methyl-5-aminopyrazole | B | 6 | Do. |
| 44 | 1,4-diaminobenzene-3-sulphonic acid | 2-amino-8-hydroxynaphthalene-6-sulphonic acid | A | 4–4,5 | Red. |
| 45 | do | 2-acetylamino-5-hydroxynaphthalene-7-sulphonic acid | A | 6–7 | Scarlet. |
| 46 | do | 1-acetylamino-5-hydroxynaphthalene-7-sulphonic acid | B | 6–7 | Red. |

Example 47

51.6 parts of the dyestuff obtained by diazotization of 1-hydroxy-2-aminobenzene-4-sulphonic acid and coupling with 2-amino-5-hydroxynaphthalene-7-sulphonic acid in water-pyridine in the presence of sodium carbonate and subsequent treatment with a copper-yielding agent, said dyestuff having the formula

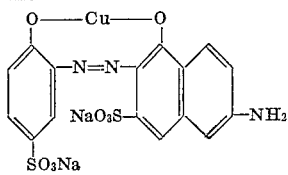

are dissolved in 1500 parts of water at pH 7. 27 parts of finely powdered 2,3-dichloroquinoxaline-6-carboxylic acid chloride are added in portions at 20–30° C. with good stirring and the hydrochloric acid set free is continuously neutralised by adjusting the pH value of the reaction medium with a sodium carbonate solution to 5–7. When free amino groups can no longer be detected, the resultant reactive dyestuff of the formula

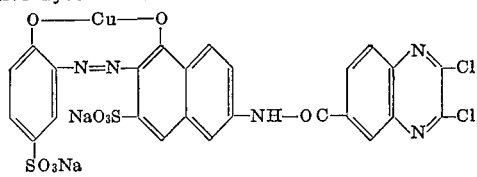

is salted out, pressed off, washed and dried under vacuum at 40–50° C. Fabrics of cellulose materials can be dyed or printed with this dystuff in ruby shades fast to wet processing, rubbing and light according to one of the processes mentioned above.

In the following table there are listed the heavy metal complexes of further aminoazo dyestuffs and the reactive components linked with the amino group, as well as the shades of these dyestuffs on cellulose materials. The production of the aminoazo dyestuffs, their metal complexes and their reaction with the reactive components can be carried out analogously to the instructions of Example 47.

ing copper-phthalocyanine tetrasulphonic acid are suspended in form of the moist thoroughly washed suction-filter cake in 500 parts of water and 500 parts of ice, a solution of 50 parts of the sodium salt of 1,3-diaminobenzene-4-sulphonic acid in 500 parts of water are added and the pH is adjusted to 8.5 with sodium carbonate. The suspension is stirred at room temperature for 24 hours and a constant pH of 8.5 is maintained by the continuous addition of sodium carbonate. The resulting condensation product is precipitated at pH 1–2 by the addition of sodium chloride, filtered off with suction, washed and then re-dissolved neutral in 1000 parts of water. A solution of 80 parts of 2,3-dichloroquinoxaline-6-carboxylic acid chloride in 300 parts of benzene is added dropwise with intense stirring to the blue solution and the mixture is stirred at 30–40° C. while continuously neutralising the hydrochloric acid set free by adjusting the pH value of thionyl chloride on copper phthalocyanine, or the isomeric copper phthalocyanine-tetrasulphochloride built up from 1-sulpho-benzene-3,4-dicarboxylic acid via the corresponding the mixture by means of sodium carbonate solution to 5–7. Stirring is continued until free amino groups can no longer be detected. The reactive dyestuff thus obtained having the formula

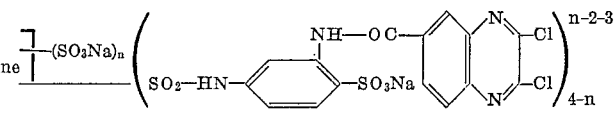

is salted out, washed and dried under vacuum at 30–40° C. It is a dark blue powder dissolving in water with a blue colour and dyes cotton and regenerated cellulose according to one of the dyeing or printing processes mentioned above in clear blue shades of good fastness to wet processing, rubbing and light.

A similar dyestuff is obtained by using, instead of 50 parts of the sodium salt of 1,3-diaminobenzene-4-sulphonic acid, 40 parts of the sodium salt of 1,4-diaminobenzene-2-sulphonic acid and instead of 80 parts of 2,3-dichloroquinoxaline 6-carboxylic acid chloride, 60 parts of 2,3-dichloro-quinoxaline-6-isocyanate dissolved in 300 parts of benzene and by maintaining a pH of 7–7.5 (phos-

ABBREVIATIONS FOR THE REACTIVE COMPONENTS AS IN THE TABLE OF EXAMPLE 3

| Example No. | Aminoazo dyestuff | Complex bound heavy metal | Reactive component | Shade |
|---|---|---|---|---|
| 48 | 1-hydroxy-2-aminobenzene-4,6-disulphonic acid ⟶2-amino-5-hydroxynaphthalene-7-sulphonic acid. | Cu | A | Ruby. |
| 49 | 1-hydroxy-2-aminobenzene-4-sulphonic acid ⟶2-ethylamino-5-hydroxynaphthalene-7-sulphonic acid. | Cu | C | Do. |
| 50 | 1-diazo 2-hydroxy-6-nitronaphthalene-4-sulphonic acid ⟶2-amino-5-hydroxynaphthalene-7-sulphonic acid. | Cu | A | Violet. |
| 51 | do | Cr | A | Greenish grey. |
| 52 | 1-diazo-2-hydroxy-6-nitronaphthalene-4-sulphonic acid ⟶1-amino-g-hydroxynaphthalene-4-sulphonic acid. | Co | B | Reddish black. |
| 53 | 1-amino-2-hydroxy-5-methylsulphonylbenzene ⟶1-amino-8-hydroxynaphthalene-3,6-disulphonic acid. | Cu | A | Violet. |
| 54 | do | Co | A | Grey. |
| 55 | do | Cr | A | Greenish black |
| 56 | 1-amino-2-methylbenzene-4-sulphonic acid ⟶1-amino-2-hydroxy-5-methylbenzene⟶1-amino-8-hydroxynaphthalene-4,6-disulphonic acid. | Cu | B | Blue. |
| 57 | do | Co | B | Grey. |
| 58 | do | Cr | A | Greenish black. |
| 59 | The monoazo dyestuff (1-amino-2-chlorobenzene-4-sulphonic acid ⟶1-hydroxy-2-acetyl-aminobenzene) saponified at the 2-positioned acetylamino group ⟶1-amino-8-hydroxy-naphthalene-3,6-disulphonic acid. | Cu | A | Navy blue. |
| 60 | do | Co | A | Grey. |
| 61 | 1-amino-8-hydroxynaphthalene-4-sulphonic acid ⟶1-hydroxy-2,6- diaminobenzene-4-sulphonic acid ⟶1,3-dihydroxybenzene. | Co | A | Black. |
| 62 | 1-amino-8-hydroxynaphthalene-3,6-disulphonic acid ⟶1-hydroxy-2,6-diaminobenzene-4-sulphonic acid ⟶2-hydroxynaphthalene. | Co | A | Do. |
| 63 | 1-amino-8-hydroxynaphthalene-4-sulphonic acid ⟶1-hydroxy-2,6-diaminobenzene-4-sulphonic acid ⟶3-methylpyraolzone-(5). | Co | A | Do. |

EXAMPLE 64

96 parts (referred to 100% goods) of copper-phthalocyanine tetrasulphochloride freshly prepared in conventional manner by the action of chlorosulphonic acid and phate buffer) while stirring the benzenic 2,3-dichloro-quinoxaline-6-iso-cyanate solution with the solution of the amino group-containing phthalocyanine dyestuff.

Instead of 96 parts of copper-phthalocyanine tetrasulphochloride, there may also be used 87 parts (referred to 100% material) of the copper- or nickel-phthalocyanine trisulphochloride obtainable by the action of chlorosulphonic acid on copper- or nickel-phthalocyanine, in the form of the moist suction-filter cake thoroughly washed with ice-water, the procedure otherwise being the same as in Example 64; reactive dyestuffs dyeing in clear blue shades are thus obtained.

When working as indicated in Example 64, but starting from 87 parts of copper-phthalocyanine trisulphochloride and using, instead of 50 parts of the sodium salt of 1,3-diamino-benzene-4-sulphonic acid, 90 parts of the sodium salt of 4,4'-diamino-diphenyl-2,2'-disulphonic acid or 90 parts of the sodium salt of 4,4'-diamino-stilbene-2,2'-disulphonic acid, reactive dyestuffs are also obtained which dye cellulose materials according to one of the processes described above in clear blue shades fast to wet processing rubbing and light.

When starting from 4',4''',4''',4'''' - tetraphenyl - Cu-phthalocyanine, there is obtained, after sulphochlorination and reaction with 1,3-phenyldiamine-4-sulphonic acid and acylation with 2,3-dichloroquinoxaline-6-carboxylic acid chloride, a reactive dyestuff which dyes cellulose materials in the presence of acid-binding agents in clear green shades fast to wet processing and light.

Example 65

71 parts of the amino-anthraquinone dyestuff obtained by reaction of 1-amino-4-bromo-anthraquinone-2-sulphonic acid with an excess of 4,4'-diamino-diphenyl-2,2'-disulphonic acid are dissolved in 700 parts of water, 27 parts of finely powdered 2,3-dichloroquinoxaline-6-carboxylic acid chloride are introduced at 20–30° C. with good stirring and a pH of 6–7 is maintained by the continuous addition of sodium carbonate solution. When amino groups can no longer be detected, the dyestuff of the formula

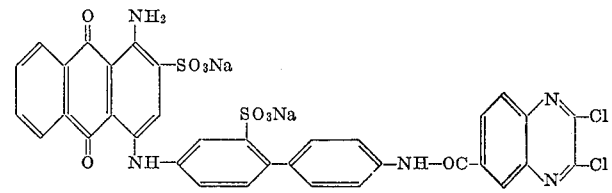

is salted out, washed and dried under vacuum at 40° C. The dyestuff dyes cotton and regenerated cellulose according to one of the processes indicated above in blue shades fast to wet processing, rubbing and light.

When proceeding as indicated in Example 65, but using, instead of the starting dyestuff there employed, equivalent amounts of one of the following derivatives of 1-amino-4-(aminoarylamino)-anthraquinone-2-sulphonic acid, similar dyestuffs are obtained whose blue dyeings exhibit fastness properties similar to those of the dyestuff obtained above: 1 - amino - 4 - (4'-amino-2'-sulphophenylamino) anthraquinone - 2 - sulphonic acid, 1-amino-4-(4'-aminophenylamino)-anthraquinone-2,6-disulphonic acid, isomer mixture of 1 - amino - 4-(4'-aminophenylamino)-anthraquinone-2,4- and 2,8-disulphonic acid, isomer mixture of 1 - amino - 4 - (4'-amino-2'-sulphophenylamino)-anthraquinone-2,4- and 2,8-disulphonicacid, isomer mixture of 1 - amino - 4-(3'-aminophenylamino)-anthraquinone-2,5- and -2,8 - disulphonic acid, 1 - amino-4-(3'-aminophenylamino)-anthraquinone-2,6-disulphonic acid, 1-amino-4-(3' - amino - 4'-sulphophenyl-amino)-anthraquinone-2-sulphonic acid. With 1-amino-4-(4'-[4''-amino-2''-sulphophenyl]amino-phenyl) - anthraquinone - 2,6 - disulphonic acid there are obtained reactive dyestuffs dyeing bluish grey shades.

Example 66

When proceeding as indicated in Example 47, but starting, instead of from the copper-containing aminomonoazo dyestuff there employed, from the equivalent amount of the chromium complex of the aminoazo dyestuff obtained by coupling diazotized 1-amino-2-hydroxy-3-chlorobenzene-5-sulphonic acid with 1-[3'-(3''-aminophenyl)-sulphonylimido - sulphonyl] - phenyl-3-methyl-pyrazolone-(5), a reactive dyestuff is obtained which dyes cellulose materials according to one of the processes described above in yellow-brown shades of good fastness to wet processing, rubbing and light.

Example 67

Into a solution of 36.5 parts of the sodium salt of 1-amino-8-hydroxynaphthalene-3,6-disulphonic acid in 200 parts of water, 23 parts of finely powdered 3- or 2-monochloroquinoxaline-6-carboxylic acid chloride of B.P. 138–139° C./0.28 mm. Hg are introduced with good stirring and the mixture is stirred at 40° C. while continuously neutralising the hydrochloric acid set free by maintaining a pH value of the mixture of 3–6; stirring is continued until free amino groups can no longer be detected, which takes about 15–20 minutes. The clear solution of the dyestuff intermediate thus obtained is coupled, with the addition of 12 parts of sodium carbonate dissolved in 100 parts of water at 5–10° C. and a pH of 6.5–7.5, with 17.5 parts of diazotized 2-aminobenzene-sulphonic acid in 200 parts of water. The resultant red dyestuff has partly crystallised and is separated by the addition of 50 parts of sodium chloride. After filtering off with suction, washing with a dilute sodium hydrochloride solution and drying at 40–50° C. under vacuum, the dyestuff is obtained in form of a powder easily dissolving in water with a red colour and having the formula

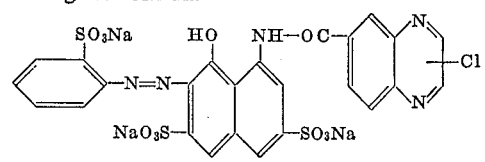

In this dyestuff as well as in the halogenoquinoxaline starting component the position of the chlorine atom could not exactly be determined.

A cotton fabric is impregnated with a solution of 20–25° C. containing per litre of liquor 25 g. of the above dyestuff and 0.5 g. of a non-ionogenic wetting agent (e.g. a polyoxyethylated oleyl alcohol), 150 g. of urea and 20 g. of sodium carbonate. Subsequently the fabric is squeezed off between two rubber rollers to a moisture content of about 100%. After intermediate drying at 50–60° C,. the material is heated to 140° C. for 10 minutes, the dyeing thus obtained thoroughly rinsed with hot water and treated at the boiling point for 20 minutes with a solution containing 5 g. of Marseille soap and 2 g. of sodium carbonate per litre. After rinsing and drying, a brilliant red dyeing is obtained having very good fastness to wet processing, rubbing and light.

According to one of the other dyeing or printing processes described in Examples 1 to 3, 18 and 30, clear red shades of good fastness properties are likewise obtained on materials of cellulose or synthetic polyamides.

The 3- or 2 - chloroquinoxaline - 6-carboxylic acid chloride used in this example is obtained in the following way:

1 mol of 3,4-diaminobenzoic acid and 1 mol of monochloracetic acid are boiled under reflux in a weakly ammoniacal aqueous solution for one hour. The clear solution is rendered strongly alkaline with sodium hydroxide solution, treated with 1,2 mol of hydrogen peroxide at room temperature and stirred for another hour at 70° C. The 2- or 3-monohydroxy-quinoxaline-6-carboxylic acid is isolated by acidification, dried and boiled under reflux with 6 mols of thionyl chloride and some dimethyl formamide until hydrogen chloride no longer evolves. After distilling off the excess thionyl chloride the residual 2- or 3-monochloro-quinoxaline-6-carboxylic acid chloride is distilled in a high vacuum.

Example 68

When proceeding as indicated in Example 18 but adding to the aqueous suspension of the dyestuff intermediate obtained from 1-amino-8-hydroxynaphthalene-3,6-disulfonic acid and 2,3-dichloro-quinoxaline-6-carboxylic acid chloride after the suspension was made up with water to 400 parts, 11.5 parts of the monosodium salt of thioglycolic acid dissolved in 50 parts of water and neutralising the hydrochloric acid liberated at 45° C. by means of soda solution in order to keep the pH value of the mixture at 5 to 7, a thinly liquid suspension of a monochloro quinoxaline derivative is obtained after 3 hours' reaction. The product thus obtained is coupled with 17.5 parts of diazotised o-sulfanilic acid in the presence of 12 parts of soda, the dyestuff of the following constitution thus being obtainable:

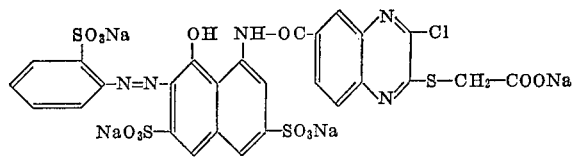

It can be used for printing of cellulosic material in the presence of sodium bicarbonate or dyeing of cellulosic materials from a long bath at 80° C. in the presence of soda. Clear red shades are obtained which possess good wet fastness properties and good fastness to rubbing and to light.

Example 69

6.2 parts of 2,3-dichloro-6-amino-quinoxaline are stirred in 30 parts by volume of glacial acetic acid and then treated with 8 parts by volume of concentrated hydrochloric acid, 100 parts of ice and 2 parts of sodium nitrite. After stirring at 0–5° C. for ½ hour, the amine has dissolved and diazotization is completed. The excess nitrous acid is removed and a solution of 10 parts of the sodium salt of 1-(2',5'-dichloro-4'-sulfophenyl)-3-methylpyrazolone-(5) in 100 parts of water is added. After neutralisation with concentrated sodium hydroxide solution to pH 4 in a stirrer with good ice-cooling, the coupling is completed. The precipitated dyestuff of the formula

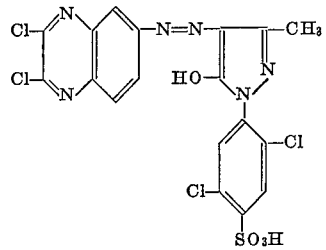

is filtered off, washed and dried at 45° C. under vacuum. The dyestuff dyes cellulose materials according to the process described in Example 3 in reddish yellow shades fast to light and wet processing.

Example 70

27.5 parts of 2-methylamino-5-hydroxynaphthalene-7-sulphonic acid sodium salt are dissolved in 150 parts of water, treated with 26.5 parts of finely powdered 2,3-dichloro-quinoxaline-6-carboxylic acid chloride and stirred at 35–40° C. for ½ hour while continuously neutralising the hydrochloric acid formed by adjusting the pH to 4–6 with a total of 34 parts by volume of a 16% sodium carbonate solution. Acylation is completed already after 15 minutes, the pH is 6 and does not change any more.

By the addition of 200 parts of water, the partially crystallised reaction product is dissolved at 45° C. 30 parts of sodium bicarbonate are then added and a diazo suspension from 34 parts of the disodium salt of 2-aminonaphthalene-1,7-disulphonic acid in 200 parts of water is added dropwise at 40° C. within 15 minutes. The reactive dyestuff immediately formed and having the formula

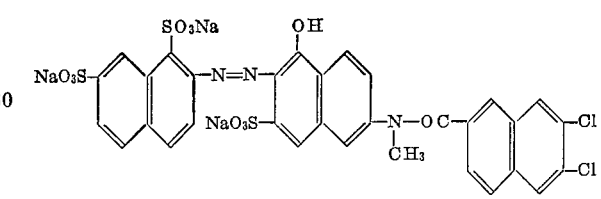

is after-stirred for an hour and then completely separated by the addition of 80 parts of sodium chloride, filtered off, washed with a dilute sodium chloride solution and dried under vacuum at 45° C. The dyestuff dyes cellulose materials according to the processes described above in reddish orange shades of very good fastness to wet processing and good fastness to chlorine.

If in this example instead of 26.5 parts of 2,3-dichloroquinoxaline - 6 - carboxylic acid chloride equivalent amounts of 2,3-dibromoquinoxaline - 6 - carboxylic acid bromide or 2- or 3-monobromoquinoxaline-6-carboxylic acid bromide are used and the method of preparation is otherwise carried out as indicated above an orange reactive dyestuff is obtainable which likewise dyes cotton and regenerated cellulose orange shades of dyeing properties similar to those obtainable with the corresponding 2,3-dichloro derivative.

In a similar manner orange to red reactive dyestuffs are obtained by acylation of the aminonaphthol-sulphonic acids listed in the following table with 2,3-dichloro-quinoxaline-6-carboxylic acid chloride and coupling of the resultant acylamino-naphthol-sulphonic acids with the diazo components mentioned in column 2.

| Example No. | Diazo components | Aminonaphtholsulphonic acid | Shade on cotton |
|---|---|---|---|
| 71 | 2-aminonaphthalene-1,7-disulphonic acid | 2-ethylamino-5-hydroxynaphthalene-7-sulphonic acid | Orange. |
| 72 | do | 2-(β-hydroxyethylamino)-5-hydroxynaphthalene-7-sulphonic acid | Do. |
| 73 | do | 2-amino-5-hydroxynaphthalene-7-sulphonic acid | Do. |
| 74 | do | 2-amino-5-hydroxynaphthalene-1,7-disulphonic acid | Do. |
| 75 | do | 2-amino-8-hydroxynaphthalene-6-sulphonic acid | Scarlet. |
| 76 | do | 2-amino-8-hydroxynapthalene-3,6-disulphonic acid | Do. |
| 77 | 2-aminonaphthalene-1,5-disulphonic acid | 2-methylamino-5-hydroxynaphthalene-7-sulphonic acid | Orange. |
| 78 | do | 2-ethylamino-5-hydroxynaphthalene-7-sulphonic acid | Do. |
| 79 | do | 2-(β-hydroxyethylamino)-5-hydroxynaphthalene-7-sulphonic acid | Do. |
| 80 | do | 2-amino-5-hydroxynaphthalene-7-sulphonic acid | Do. |
| 81 | do | 2-amino-5-hydroxynaphthalene-1,7-disulphonic acid | Do. |
| 82 | do | 2-amino-8-hydroxynaphthalene-6-sulphonic acid | Scarlet. |
| 83 | do | 2-amino-8-hydroxynapthalene-3,6-disulphonic acid | Do. |
| 84 | 2-aminonaphthalene-1,5,7-trisulphonic acid | 2-amino-5-hydroxynaphthalene-7-sulphonic acid | Orange. |
| 85 | do | 2-methylamino-5-hydroxynaphthalene-7-sulphonic acid | Do. |
| 86 | do | 2-amino-8-hydroxynaphthalene-6-sulphonic acid | Scarlet. |
| 87 | 2-aminobenzene-sulphonic acid | 2-methylamino-5-hydroxynaphthalene-7-sulphonic acid | Orange. |
| 88 | do | 2-(β-hydroxyethylamino)-5-hydroxynaphthalene-7-sulphonic acid | Do. |

| Example No. | Diazo components | Aminonaphtholsulphonic acid | Shade on cotton |
|---|---|---|---|
| 89 | do | 2-amino-8-hydroxynaphthalene-6-sulphonic acid | Scarlet. |
| 90 | do | 2-amino-8-hydroxynaphthalene-3,6-disulphonic acid | Do. |
| 91 | do | 2-amino-5-hydroxynaphthalene-1,7-disulphonic acid | Orange. |
| 92 | 2-aminonaphthalene-1-sulphonic acid | 1-amino-8-hydroxynaphthalene-3,6-disulphonic acid | Bluish red. |
| 93 | do | 1-amino-8-hydroxynaphthalene-4,6-disulphonic acid | Do. |
| 94 | 2-aminonaphthalene-1,5-disulphonic acid | 1-amino-8-hydroxynaphthalene-3,6-disulphonic acid | Do. |
| 95 | do | 1-amino-8-hydroxynaphthalene-4,6-disulphonic acid | Do. |
| 96 | do | 1-amino-8-hydroxynaphthalene-6-sulphonic acid | Do. |
| 97 | 2-aminonaphthalene-1,7-disulphonic acid | 1-amino-8-hydroxynaphthalene-3,6-disulphonic acid | Do. |
| 98 | do | 1-amino-8-hydroxynaphthalene-4,6-disulphonic acid | Do. |
| 99 | do | 1-amino-8-hydroxynaphthalene-6-sulphonic acid | Do. |
| 100 | 2-aminonaphthalene-1,5,7-trisulphonic acid | do | Do. |
| 101 | 1-amino-4-chlorbenzene-2-sulphonic acid | 1-amino-8-hydroxynaphthalene-3,6-disulphonic acid | Do. |
| 102 | 1-amino-2-methoxybenzene-5-sulphonic acid | do | Do. |
| 103 | 1-amino-benzene-2-carbonic acid-4-sulphonic acid | do | Do. |
| 104 | 1-amino-4-acetyl-aminobenzene-2-sulphonic acid | do | Violet. |
| 105 | do | 1-amino-8-hydroxynaphthalene-4,6-disulphonic acid | Bluish red. |

Example 106

56.8 parts of the diaminoazo dyestuff obtained by coupling of diazotized 1-amino-3-acetylaminobenzene-6-sulphonic acid with 2-aminonaphthalene-5,7-disulphonic acid in an acetic acid medium and subsequent alkaline or acidic hydrolysis of the acetylamino group, are dissolved at pH 7 in 450 parts of water. After the addition of 26.5 parts of finely powdered 2,3-dichloro-quinoxaline-6-carboxylic acid chloride, the mixture is stirred at 45° C. for about 3 hours while continuously neutralising the hydrochloric acid set free by adjusting the pH of the reaction mixture with sodium carbonate solution to 4-6. After completion of the acylation, the resultant dyestuff of the formula

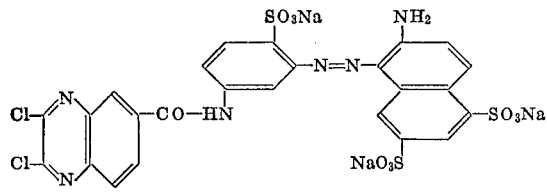

is salted out, filtered off, re-dissolved in 4000 parts of water at 60° C., filtered and separated from the filtrate in completely pure form by the addition of 400 parts of sodium chloride. The dyestuff is dried as usual at 45° C. under vacuum. It dyes cellulose materials according to one of the processes mentioned above in fast yellowish orange shades.

Example 107

To a neutral solution of 60 parts of the trisodium salt of the aminoazo dyestuff obtained by coupling diazotized 2-aminonaphthalene-3,6,8-trisulphonic acid with 3-acetyl-aminoaniline in an acetic acid medium, in 500 parts of water there are added 26.5 parts of finely powdered 2,3-dichloroquinoxaline-6-carboxylic acid chloride and the mixture is stirred at 45° C. for 6 hours, a pH value of about 6 being maintained by continuous addition of sodium hydroxide solution. The partially precipitated acylation product is completely separated at pH 6.5 by the addition of 100 parts of sodium chloride and filtered off. For purification, the reactive dyestuff thus obtained can be redissolved in 2500 parts of water at 60° C., clarified and separated again by salting out the warm filtrate with 350 parts of sodium chloride. The dyestuff has the formula

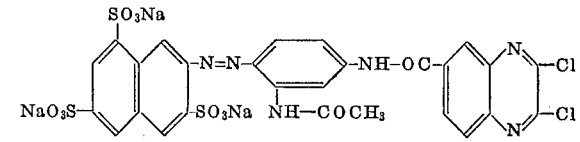

and, after filtering off, drying at 45° C., and grinding, it is a yellow powder which easily dissolves in water with a yellow colour and dyes cellulose fibres according to one of the dyeing processes mentioned above, in the presence of acid-binding agents in very fast reddish yellow shades. Fast yellow shades are also obtained on wool and polyamide fibres.

Similar dyestuffs are obtained by proceeding as indicated above, but using, instead of 60 parts of 4'-amino-2'-acetyl - aminophenyl - (1') - azo naphthalene - (2) - 3,6,8-trisulphonic acid sodium salt, corresponding quantities of the aminoazo dyestuffs obtained from the amino compounds listed in the following table in column 2, and the coupling components given in column 3 in conventional manner by diazotization and coupling in an acetic acid medium, ad by acylating with 2,3-dichloroquinoxaline-6-carboxylic acid chloride.

| Example No. | Diazo components | Coupling components | Shade on cotton |
|---|---|---|---|
| 108 | 2-aminonaphthalene-1,5-disulphonic acid | 1-amino-3-methyl-6-methoxybenzene | Strongly reddish yellow. |
| 109 | do | 1-amino-3-methylbenzene | Yellow. |
| 110 | do | 1-aminonaphthalene-6-sulphonic acid | Reddish yellow. |
| 111 | do | 1-amino-3-acetylamino-benzene | Do. |
| 112 | do | 3-aminophenyl urea | Do. |
| 113 | do | 1-amino-3-hydroxyacetylamino benzene | Do. |
| 114 | 2-aminonaphthalene-5,7-disulphonic acid | 1-amino-3-methyl-6-methoxybenzene | Strongly reddish yellow. |
| 115 | do | 1-aminonaphthalene-7-sulphonic acid | Reddish yellow. |
| 116 | do | 1-amino-3-acetylaminobenzene | Do. |
| 117 | do | 3-aminophenyl urea | Do. |
| 118 | do | 1-amino-3-hydroxyacetyl-amino benzene | Do. |
| 119 | 1-aminonaphthalene-3,7-disulphinoc acid | 1-amino-3-methyl-6-methoxybenzene | Strongly reddish yellow. |
| 120 | do | 1-amino-3-methylbenzene | Reddish yellow. |
| 121 | do | 1-aminonaphthalene-6-sulphonic acid | Do. |
| 122 | 2-aminonaphthalene-3,6-disulphonic acid | 1-amino-3-methylbenzene | Do. |
| 123 | do | 1-amino-3-methyl-6-methoxybenzene | Strongly reddish yellow. |
| 124 | do | 1-amino-3-acetylaminobenzene | Reddish yellow. |
| 125 | do | 3-aminophenyl urea | Do. |
| 126 | do | 1-amino-3-hydroxyacetylaminobenzene | Do. |
| 127 | do | 1-aminonaphthalene-6-sulphonic acid | Do. |
| 128 | 2-aminonaphthalene-6,8-disulphonic acid | 1-amino-3-acetylaminobenzene | Do. |
| 129 | do | 1-amino-2-methoxynaphthalene-6-sulphonic acid | Strongly reddish yellow. |
| 130 | do | 1-aminonaphthalene-6-sulphonic acid | Reddish yellow. |
| 131 | 2-aminonaphthalene-4,8-disulphonic acid | do | Yellow. |
| 132 | do | 1-aminonaphthalene-6-sulphonic acid | Do. |
| 133 | do | 1-amino-2-methoxynaphthalene-6-sulphonic acid | Strongly reddish yellow. |
| 134 | do | 1-methylamino-3-methylbenzene | Yellow. |
| 135 | do | 1-ethylamino-3-methylbenzene | Do. |
| 136 | do | N-methylaniline | Do. |
| 137 | do | N-ethylaniline | Do. |

| Example No. | Diazo components | Coupling components | Shade on cotton |
|---|---|---|---|
| 138 | do | N-(β-hydroxyethyl)-aniline | Do. |
| 139 | do | N-butylaniline | Do. |
| 140 | 2-aminonaphthalene-3,6,8-trisulphonic acid | Aniline | Reddish yellow. |
| 141 | do | 1-amino-3-methylbenzene | Do. |
| 142 | do | 3-aminophenyl urea | Do. |
| 143 | do | 1-amino-3-hydroxyacetylamino benzene | Do. |
| 144 | do | 1-amino-3-acetylamino-6-methoxybenzene | Yellowish orange. |
| 145 | do | 1-amino-3-acetylamino-6-methylbenzene | Reddish yellow. |
| 146 | do | 1-amino-3-methane-sulphonylaminobenzene | Do. |
| 147 | do | 2,5-dimethoxyaniline | Yellowish orange. |
| 148 | do | 3-methyl-6-methoxyaniline | Do. |
| 149 | do | N-methylaniline | Reddish yellow |
| 150 | do | N-ethylaniline | Do. |
| 151 | do | N-butylaniline | Do. |
| 152 | do | N-(β-hydroxyethyl)-aniline | Do. |
| 153 | do | 3-(N-ethylamino)-toluene | Do. |
| 154 | do | 2-aminotoluene | Do. |
| 155 | do | 1-amino-2,5-dimethylbenzene | Do. |
| 156 | do | 1-amino-2-methoxybenzene | Strongly reddish yellow. |
| 157 | do | 1-amino-3-methoxybenzene | Reddish yellow. |
| 158 | do | 1-ethylamino-3-methoxybenzene | Do. |
| 159 | do | 1-aminonaphthalene-6-sulphonic acid | Do. |
| 160 | do | 1-aminonaphthalene-7-sulphonic acid | Do. |
| 161 | 2-aminonaphthalene-4,6,8-trisulphonic acid | 1-amino-3-methylbenzene | Do. |
| 162 | do | 1-amino-3-acetylaminobenzene | Do. |
| 163 | 1-aminonaphthalene-2,4,7-trisulphonic acid | 1-amino-3-methylbenzene | Yellow. |
| 164 | do | 1-aminonaphthalene-sulphonic acid | Do. |
| 165 | 4-nitro-4'-amino-stilbene-2,2'-disulphonic acid | 1-amino 3-acetylaminobenzene | Reddish yellow. |
| 166 | do | 3-aminophenyl urea | Do. |
| 167 | do | 1-amino-3-hydroxyacetylamino benzene | Do. |
| 168 | do | N-methylaniline | Do. |
| 169 | do | N-ethylaniline | Do. |
| 170 | do | N-butylaniline | Do. |
| 171 | do | N-(β-hydroxyethyl) aniline | Do. |
| 172 | do | 1-(N-ethylamino)-3-methylbenzene | Do. |
| 173 | Aniline-2,5-disulphonic acid | 1-aminonaphthalene-6-sulphonic acid | Do. |
| 174 | do | 1-aminonaphthalene-7-sulphonic acid | Do. |
| 175 | do | 1-amino-3-methylbenzene | Yellow. |
| 176 | do | 1-amino-3-acetylaminobenzene | Do. |
| 177 | do | 1 amino-2-methoxy-5-methylbenzene | Reddish yellow. |
| 178 | do | 1-amino-2,5-dimethoxybenzene | Do. |
| 179 | Aniline-2,4-disulphonic acid | 1-amino-2-methoxy-5-methylbenzene | Do. |

EXAMPLE 180

65 parts of the dyestuffs of the formula

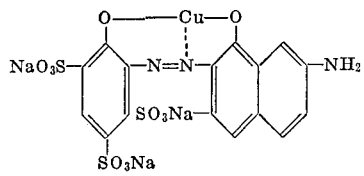

(prepared by coupling diazotized 1-hydroxy-2-aminobenzene-4,6-disulphonic acid with 2-amino-8-hydroxynaphthalene-6-sulphonic acid and coppering of the resultant azo dyestuff) are dissolved neutral in 700 parts of water. 26.5 parts of finely powdered 2,3-dichloroquinoxaline-6-carboxylic acid chloride are added thereto and the mixture is stirred at 40–50° C. while continuously neutralising the hydrochloric acid set free by adjusting the pH to 5–6 with sodium carbonate solution; stirring is continued until free amino groups can no longer be detected. The resultant reactive dyestuff of the formula

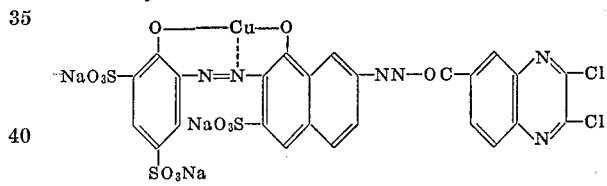

is salted out, filtered off, washed and dried at 40–50° C. The dyestuff dyes cellulose materials according to one of the processes mentioned above in very fast ruby shades.

Dyestuffs with similar properties are obtained analogously to the working method described above from the copper complexes of the azo dyestuffs prepared from the diazo and azo components listed in the following table:

| Example No. | Diazo components | Coupling components | Shade of cotton |
|---|---|---|---|
| 181 | 1-hydroxy-2-amino-benzene-4-sulphonic acid | 2-methylamino-5-hydroxynaphthalene-7-sulphonic acid | Ruby. |
| 182 | do | 2-ethyl-amino-5-hydroxynaphthalene-7-sulphonic acid | Do. |
| 183 | do | 2-(β-hydroxyethylamino)-5-hydroxynaphthalene-7-sulphonic acid | Do. |
| 184 | do | 2-amino-8-hydroxynaphthalene 3,6-disulphonic acid | Do. |
| 185 | 1-hydroxy-2-amino-benzene-4,6-disulphonic acid | 2-amino-5-hydroxynaphthalene-1,7-disulphonic acid | Do. |
| 186 | do | 2-amino-8-hydroxynaphthalene-3,6-disulphonic acid | Do. |
| 187 | do | 2-methylamino-5-hydroxynaphthalene-7-sulphonic acid | Do. |
| 188 | do | 2-ethylamino-5-hydroxynaphthalene-7-sulphonic acid | Do. |
| 189 | do | 2-(β-hydroxyethyl-amino)-5-hydroxynaphthalene-7-sulphonic acid | Do. |
| 190 | do | 1-amino-8-hydroxynaphthalene-3,6-disulphonic acid | Violet. |
| 191 | do | 1-amino-8-hydroxynaphthalene-4,6-disulphonic acid | Do. |
| 192 | 1-hydroxy-2-aminobenzene-5-sulfonic acid | 1-amino-8-hydroxynaphthalene-3,6-disulfonic acid | Do. |
| 193 | do | 1-amino-8-hydroxynaphthalene-4,6-disulfonic acid | Do. |
| 194 | 1-hydroxy-2-amino-4-acetylaminobenzene-6-sulfonic acid | 1-amino-8-hydroxynaphthalene-3,6-disulfonic acid | Bluish violet. |
| 195 | 1-hydroxy-2-amino-4-acetylaminobenzene-6-sulfonic acid (4-positioned acetylamino group subsequently saponified). | 1-ethoxy-8-hydroxynaphthalene-3,6-disulfonic acid | Do. |
| 196 | do | 1-amino-8-hydroxynaphthalene-2,4-disulfonic acid | Blue. |
| 197 | do | 1-amino-8-hydroxynaphthalene-2,4,6-trisulfonic acid | Do. |
| 198 | 1-hydroxy-2-amino-6-acetylaminobenzene-4-sulfonic acid (saponified). | 1-amino-8-hydroxynaphthalene-2,4-disulfonic acid | Do. |
| 199 | 1-diazo-2-hydroxy-6-nitronaphthalene-4-sulfonic acid (6-positioned nitro group subsequently reduced to NH₂). | do | Do. |
| 200 | 1-diazo-2-hydroxy-6-nitronaphthalene-4-sulfonic acid (reduced). | 1-amino-8-hydroxynaphthalene-2,4,6,trisulfonic acid | Do. |
| 201 | 1-hydroxy-2-amino-6-acetylaminobenzene-4-sulfonic acid (saponified). | do | Do. |

Example 202

The reaction product from 1,3-diaminobenzene-6-sulfonic acid and 2,3-dichloroquinoxaline-6-carboxylic acid chloride obtained according to the method given in Example 30, is coupled in sola-alkaline medium with 40 parts of 1 - acetylamino - 8 - hydroxynaphthalene-3,6-disulfonic acid. The dyestuff thus formed is isolated as in Example 30. It dissolves in water and dyes cellulose-containing materials, particularly textile materials of cotton and regenerated cellulose, with the aid of soda as acid-binding agent from a long liquor at 40° C. in the so-called cold pad batch process or according to the pad steam or pad dry heat fixing process (at 140° C.) bluish red shades which distinguish themselves by very good fastness to wet processing, to rubbing and to light and which are good dischargeable to white.

Example 203

A fabric of cotton or staple fibre is impregnated on a foulard at 20 to 25° C. with a solution which contains per litre 30 g. of the dyestuff described in Example 18, 100 g. of urea and 20 g. of soda. The fabric is squeezed off to a moisture content of 100% and the moist fabric then rolled up. After 4 to 24 hours' storing at room temperature the fabric is rinsed in water and soaped at the boil and dried. One obtains a clear bluish red dyeing having good fastness to wet processing, to rubbing and to light.

Example 204

A cellulosic fabric is printed with a printing paste which contains per kilogram 30 g. of the dyestuff described in Example 18, 100 g. of urea, 300 g. of water, 500 g. of alginate thickening (containing 60 g. of sodium alginate per kg. of thickening), 10 g. of soda and 10 g. of the sodium salt of 3-nitrobenzene-sulfonic acid, the printing paste being made up to 1 kilogram with water, and the fabric is after intermediate drying steamed in a suitable steaming apparatus at 103 to 115° C. for 30 seconds. After rinsing and soaping at the boil a strong bluish red print having good fastness to wet processing, rubbing and to light is thus obtainable.

Example 205

100 parts of a woollen fabric are introduced at 40° C. into a dye-bath which contains in 5 l. of water 1.5 parts of the reactive dyestuff described in Example 70 as well as 6 parts of 30% acetic acid and 0.5 part of a polyhydroxyethylated hydroxyl group-containing stearyl amine derivative. The dye-bath is heated to the boil within 30 minutes and dyeing continued at this temperature for one hour. The dyed fabric is then rinsed in water and dried, a brilliant orange shade thus being obtainable having excellent fastness to washing, milling and light.

Example 206

26.5 parts of finely powdered 2,3-dichloroquinoxaline-6-carboxylic acid chloride are added to a neutral solution of 53.15 parts of the disodium salt of the monoazo dyestuff obtained by coupling diazotised 1-amino-4-nitro benzene-2-sulfonic acid with 1-(2'-chloro-5'-sulfophenyl)-3-methyl-5-pyrazolone, followed by reduction of the nitro group with sodium sulfide, in 300 parts of water. The mixture is stirred at 45 to 50° C. for 2 hours while neutralising the liberated hydrochloric acid by continuously adjusting the pH to 4 to 6 by means of aqueous soda solution. The precipitated dyestuff corresponds to the formula

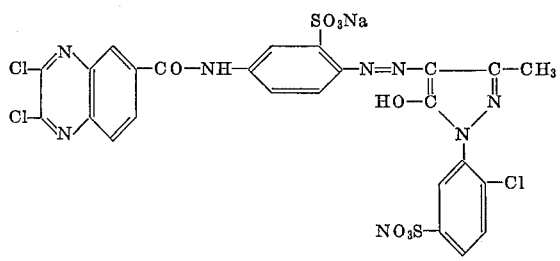

It is filtered, again dissolved in 3 l. of water at pH 6 to 7 and precipitated from the filtered solution by means of sodium chloride. The dyestuff is filtered with suction and dried. A yellow powder is thus obtainable which easily dissolves in water and which dyes cellulose-containing materials from a long liquor at 40° C. or according to the so-called low-temperature pad batch process with the use of soda as acid-binding agent, clear yellow shades being fast to washing, rubbing and light.

If proceeding in analogous manner but using in this example instead of the aminoazo dyestuff obtained from 1-diazo-4-nitrobenzene-2-sulfonic acid and 1-(2'-chloro-5'-sulfophenyl)-3-methyl-5-pyrazolone and subsequent reduction the aminoazo dyestuffs prepared from the starting components listed in the following table one likewise obtains valuable fibre-reactive dyestuffs the shade of which on cellulose-containing textile materials is indicated below.

| No. | Diazo components | Azo components | pH value of the reaction mixture | Shade on cellulose |
|---|---|---|---|---|
| 207 | 1-amino-4-nitrobenzene-2-sulfonic acid (4-positioned nitrogroup subsequently reduced to NH₂). | 1-(4'-sulfophenyl)-3-methyl-pyrazolone (5) | 5-6 | Yellow. |
| 208 | do | 1-(4'-sulfophenyl)-3-carboxy-pyrazolone (5) | 5-6 | Reddish yellow. |
| 209 | do | 1-(3'-sulfophenyl)-3-methyl-5-aminopyrazole | 6-7 | Yellow. |
| 210 | 1-amino-3-acetylaminobenzene-6-sulfonic acid (3-positioned acetylamino group subsequently saponified). | do | 6-7 | Do. |
| 211 | do | 1-(-βhydroxyethyl)-3-methylpyrazolone-(5) | 5-6 | Do. |
| 212 | 2 mols of 1-amino-3-acetylaminobenzene-6-sulfonic acid (saponified). | 1 mol of bispyrazolone from 4,4-bis-hydrazino-dibenzyl-2,2'-disulfonic acid and acetoacetic ethylester. | 5-6 | Do. |
| 213 | 1 mol 1-amino-3-acetylaminobenzene-6-sulfonic acid (saponified). | 1-(4'-sulfophenyl)-3-carboxy-pyrazolone-(5) | 5-6 | Do. |
| 214 | 1-amino-5-acetylaminonaphthalene-3,7-disulfonic acid (saponified). 0 | do | 5-6 | Reddish yellow. |
| 215 | 1-amino-2-methylbenzene-4,6-disulfonic acid | 2-acetylamino-5-naphthol-7-sulfonic acid (saponified) | 7-8 | Orange. |
| 216 | do | 2-acetylamino-8-naphthol-6-sulfonic acid (saponified) | 7-8 | Red. |
| 217 | do | 1-chloro-2-acetylamino-5-naphthol-7-sulfonic acid (saponified) | 7-8 | Orange. |
| 218 | 1-aminobenzene-2-sulfonic acid | 1-acetylamino-8-hydroxynaphthalene-4,6-disulfonic acid (saponified). | 7-8 | Red. |
| 219 | 2-aminonaphthalene-3,6-disulfonic acid | do | 7-8 | Bluish red. |
| 220 | 2-aminonaphthalene-3,7-disulfonic acid | do | 7-8 | Do. |
| 221 | 2-aminonaphthalene-4,8-disulfonic acid | do | 7-8 | Do. |
| 222 | 2-aminonaphthalene-3,6-disulfonic acid | 1-acetylamino-8-hydroxynaphthalene-3,6-disulfonic acid (saponified). | 7-8 | Do. |
| 223 | 2-aminonaphthalene-4,8-disulfonic acid | do | 7-8 | Do. |
| 224 | 1-amino-4-methoxybenzene-2-sulfonic acid | 2-(N-acetyl-N-methylamino)-5-hydroxynaphthalene-7-sulfonic acid (saponified). | 7-8 | Yellowish. |
| 225 | do | 2-(N-acetyl-N-methylamino)-8-hydroxynaphthalene-6-sulfonic acid (saponified). | 7-8 | Red. |
| 226 | 1-aminobenzene-2-sulfonic acid | do | 7-8 | Red. |
| 227 | 1-aminobenzene-3-sulfonic acid | do | 7-8 | Red. |

| No. | Diazo components | Azo components | pH value of the reaction mixture | Shade on cellulose |
|---|---|---|---|---|
| 228 | 1-aminobenzene-4-sulfonic acid | do | 7-8 | Red. |
| 229 | 1-amino-4-methylbenzene-2-sulfonic acid | do | 7-8 | Do. |
| 230 | 1-amino-2,4-dimethylbenzene-6-sulfonic acid | do | 7-8 | Do. |
| 231 | do | 2-acetylamino-8-hydroxynapthalene-6-sulfonic acid (saponified) | 7-8 | Red. |
| 232 | do | 2-acetylamino-8-hydroxynaphthalene-3,6-disulfonic acid (saponified) | 7-8 | Red. |
| 233 | 4-aminoazobenzene-3,4'-disulfonic acid | 1-amino-3-acetylaminobenzene | 5-6 | Yellowish brown. |
| 234 | do | 1-amino-3-hydroxyacetylaminobenzene | 5-6 | Do. |
| 235 | do | 1-aminonaphthalene-6-sulfonic acid | 5-6 | Do. |
| 236 | do | 1-aminonaphthalene-7-sulfonic acid | 5-6 | Do. |
| 237 | do | 1-amino-2-(4'-amino-2'-sulfophenyl-(1')-azo)-8-hydroxynaphthalene-3,6-disulfonic acid. | 8 | Black |

In the preceding tables the expression "saponified" means that an acylamino group being present in the aminoazo dyestuff is saponified, and the expression "reduced" means that a nitro group being present in the diazo compound is reduced after coupling to form the aminoazo dyestuff.

EXAMPLE 238

52.4 parts of the disodium salt of 4-([4''-aminophenyl] amino)-2'-nitrodiphenylamine-3,4'-disulfonic acid are dissolved in 1 l. of water and stirred with 26.5 parts of finely powdered 2,3-dichloroquinoxaline-6-carboxylic acid chloride at 45 to 50° C. for 5 hours. The hydrochloric acid set free is continuously neutralised by adjusting the pH value of the reaction mixture to 4 to 6 by means of soda. The nitro dyestuff thus obtained corresponds to the formula

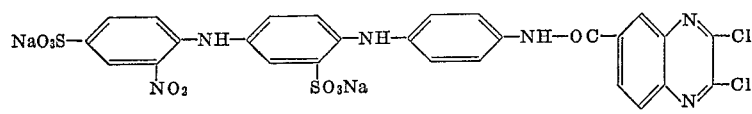

It is salted out, filtered with suction, washed and dried. It dyes cellulose-containing materials in the presence of soda deep violet brown shades being fast to wet processing and to rubbing.

Example 239

The condensation product of the sodium salt of 1-amino-8-hydroxynaphthalene-3,6-disulfonic acid and 2,3-dichloroquinoxaline-6-carboxylic acid chloride which is obtainable according to the method given in Example 18 is diluted with 400 parts of water, and 19.5 parts of the sodium salt of 1-aminobenzene-3-sulfonic acid dissolved in little water are added. The mixture is then adjusted to a pH of 2.5 to 3 with some hydrochloric acid and stirred at 45 to 50° C. for 4 hours. During this reaction time the pH is kept at 2.5 to 3 by addition in parts of a total of 5.3 parts of soda dissolved in little water. When 1-aminobenzene-3-sulfonic acid is no longer detectable by diazotisation and coupling (color formation) the reaction mixture is neutralised with soda to pH 6 and, after the addition of further 12 parts of soda, combined at 5 to 10° C. with the diazonium salt solution from 9.3 parts of aniline. The desired dyestuff immediately precipitates; it has the formula

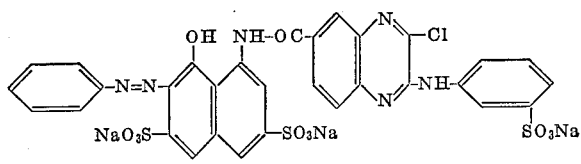

After filtering with suction it is redissolved neutral in 2 l. of water at 50° C. The solution is filtered and the purified dyestuff precipitated by the addition of 200 parts of common salt. The filtered product is dried and pulverised. It represents a red powder which easily dissolves in water and dyes cellulose materials in the presence of soda from a long liquor at 80° C. bluish red shades of good fastness to wet processing, to rubbing and to light.

Example 240

26.5 parts of finely powdered 2,3-dichloroquinoxaline-5-carboxylic acid chloride (M.P. 113 to 114° C.) are added with good stirring to a solution of 36.5 parts of the sodium salt of 1-amino-8-hydroxynaphthalene-3,6-disulfonic acid in 100 parts of water and the mixture is stirred at 20 to 40° C. while neutralising the liberated hydrochloric acid and maintaining the pH at 4 to 6. Stirring is continued until free amino groups of the starting materials are no longer detectable. The reaction mixture is diluted with 600 parts of water, 12 parts of soda are added and the mixture is slowly treated at 5 to 10° C. with a solution of 17.5 parts of diazotised 2-aminobenzenesulfonic acid in 200 parts of water. The dyestuff of the formula

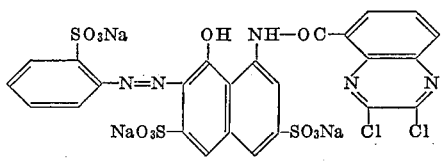

is obtained which at the final pH 7 is salted out, filtered with suction, washed with dilute sodium chloride solution and dried under vacuum at 40 to 50° C. The product dyes materials from cotton and regenerated cellulose, wool or synthetic polyamide fibres clear bluish red shades of good fastness to wet processing, to rubbing and to light.

Red dyestuffs having similar fastness properties are obtained if the process of this example is carried out with the use of equivalent amounts of the condensed 2-chloropyrazine derivatives listed in the following table instead of 2,3-dichloroquinoxaline-5-carboxylic acid chloride:

| Number: | Condensed 2-chloropyrazine derivative |
|---|---|
| 241 | (2,3-dichloro-quinoxalinyl-6)-acetylchloride. |

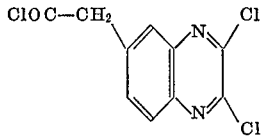

| | |
|---|---|
| 242 | 2,3-dichloro-quinoxaline-8-methyl-6-carboxylic acid chloride. |
| 243 | 2,3-dichloro-quinoxaline-5-chloro-6-carboxylic acid chloride. |
| 244 | 2,3-dichloro-quinoxaline-7-chloro-6-carboxylic acid chloride. |
| 245 | 2,3-dichloro-quinoxaline-8-chloro-6-carboxylic acid chloride. |
| 246 | 2,3-dichloro-quinoxaline-5,8-dichloro-6-carboxylic acid chloride. |
| 247 | 2,3-dichloro-quinoxaline-7-nitro-6-carboxylic acid chloride. |
| 248 | 2,3-dichloro-quinoxaline-8-methylsulfonyl-6-carboxylic acid chloride. |
| 249 | 2,3-dichloro-quinoxaline-7-methoxy-6-carboxylic acid chloride. |
| 250 | 2,3-dichloro-quinoxaline-8-chloro-6-sulfonic acid chloride. |
| 251 | 2,d-dichloro-quinoxaline-8-cyano-6-sulfonic acid chloride. |
| 252 | 2-chloro-3-methoxy-quinoxaline-6-carboxylic acid chloride. |
| 253 | 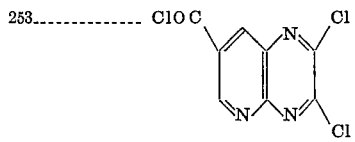 |
| 254 | 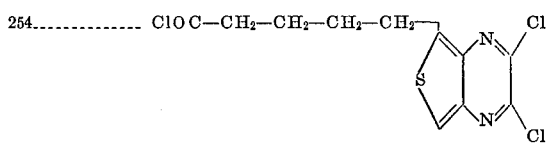 |

Example 255

21.4 parts of 2,3-dichloro-6-amino-quinoxaline are pasted with 100 parts of glacial acetic acid, then treated with 28 parts by volume of concentrated hydrochloric acid and 350 parts of ice; to this mixture there is added dropwise within 10 minutes the solution of 7 parts of sodium nitrite in 30 parts of water. After stirring at 0 to 5° C. for half an hour the amine has completely dissolved and the diazotisation has finished. Excess nitric acid is destroyed and the diazonium salt solution filtered. It is then allowed to run with ice cooling into a solution of 18.1 parts of N,N-di-(β-hydroxyethyl)-aniline in 200 parts of water and 10 parts by volume of concentrated hydrochloric acid. After neutralising the mineral acid with soda-lye to pH 5 to 6 the coupling is completed and the water-insoluble azo dyestuff of the formula

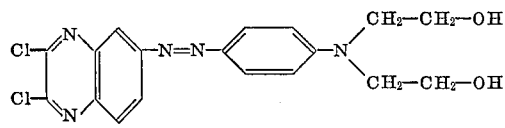

precipitated. It is filtered with suction, washed with water and dried under vacuum at 40 to 50° C.

The dyestuff dyes from aqueous dispersion polyester fibres orange shades with very good fastness to wet processing, to sublimation and to light; synthetic polyamide fibres can be dyed in yellowish orange shades which possess very good wet fastness properties.

Example 256

If 2,3-dichloro-6-amino-quinoxaline is diazotised as prescribed in Example 255 and the diazonium salt solution is allowed to run into a solution of 9.4 parts of phenol in 200 parts of water and 140 parts of soda-lye, the dyestuff thus formed precipitates while buffering the reaction solution to a pH of 6 to 7. The dyestuff is filtered, washed with water and dried under vacuum at 40 to 50° C. An aqueous dispersion of the dyestuff dyes synthetic polyamide fibres reddish yellow shades possessing excellent fastness to wet processing and to light.

Example 257

A neutral solution of 54.7 parts of the disodium salt of 1-amino-4-(2'-methyl-3'-aminophenyl)-amino - anthraquinone-2,5'-disulfonic acid in 1000 parts of water are stirred at 30° C. for 4 hours with 26.5 parts of finely powdered 2,3 - dichloro - quinoxaline - 6 - carboxylic acid chloride. The liberated hydrochloric acid is continuously neutralised by adjusting the pH of the mixture to 6.5 to 7. After the reaction is complete the reactive dyestuff thus formed and having the formula

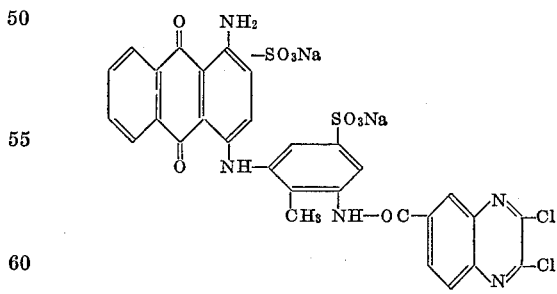

is salted out, filtered, washed and dried at 40 to 50° C. It dyes cellulosic materials for instance from long bath at 70 to 80° C. with the aid of soda as acid binding agent clear blue shades having very good fastness to wet processing, to rubbing and to light.

Anthraquinone dyestuffs of similar dyeing properties are obtained if proceeding as indicated above but using instead of the afore-mentioned water-soluble amino anthraquinone derivatives equivalent quantities of the anthraquinone sulfonic acid derivatives indicated in the following table, and acylating them with 2,3-dichloro-quinoxaline-6-carboxylic acid chloride.

| No. | Water-soluble amino-anthraquinone derivative |
|---|---|
| 258 | 1-amino-4-(3'-aminophenyl)-amino-anthraquinone-2,5'-disulfonic acid. |
| 259 | 1-amino-4-(2'-chloro-3'-aminophenyl)-amino-anthraquinone-2,5'-disulfonic acid. |
| 260 | 1-amino-4-(2'-methyl-3'-methylaminophenyl)-amino-anthraquinone-2,5'-disulfonic acid. |
| 261 | 1-amino-4-(4'-aminophenyl)-amino-anthraquinone-2,6,3'-trisulfonic acid. |
| 262 | 1-amino-4-(3'-aminophenyl)-amino-anthraquinone-2,6,4'-trisulfonic acid. |
| 263 | 1-amino-4-(4'-aminophenyl)-amino-anthraquinone-2,5,3'-trisulfonic acid. |
| 264 | 1-amino-4-(3'-aminophenyl)-amino-anthraquinone-2,5,4'-trisulfonic acid. |
| 265 | Mixture of 1-amino-4-(3'-aminophenyl)-amino-anthraquinone-2,4',5- and -2,4',8-trisulfonic acid. |

The following products are after-sulfonated at 20 to 30° C. with 5% oleum:

| No. | Water-soluble amino-anthraquinone derivative |
|---|---|
| 266 | 1-amino-4-[4'-(4''-aminobenzyl)-phenyl]-amino-anthraquinone-2-sulfonic acid. |
| 267 | 1-amino-4-(4'-methylaminophenyl)-amino-anthraquinone-2-sulfonic acid. |
| 268 | 1-amino-4-(3'-methylaminophenyl)-amino-anthraquinone-2-sulfonic acid. |
| 269 | 1-amino-4-(2'-methylaminophenyl)-amino-anthraquinone-2-sulfonic acid. |
| 270 | 1-amino-4-(7'-amino-naphthyl-[2'](-amino-anthraquinone -2-sulfonic acid. |
| 271 | Condensation product obtained from combining 1 mol of cyanuric chloride, 1 mol of 1,4-diamino-anthraquinone-2-sulfonic acid, 1 mol of aniline-2,5-disulfonic acid and 1 mol of ethylene diamine (half partly condensed) when acylated with 2,3-dichloro-quinoxaline-6-carboxylic acid yields a violet reactive dyestuff. |

Example 272

A solution of 107 parts of a mixture from equal molecular parts of copper phthalocyanine-(3,3',3'')-trisulfonic acid-mono-(m-amino-p-sulfophenyl)-amide and copper phthalocyanine - (3,3',3'')-trisulfonic acid-di-(m-amino-p-sulfophenyl)-amide are made up with water to a volume of 1.3 l. and adjusted to pH 6; into this solution 40 parts of finely powdered 2,3-dichloro-quinoxaline-6-carboxylic acid chloride are introduced at 20 to 25° C. The temperature is increased, while stirring, for about 5 to 10° C. each hour and finally kept at 45 to 50° C. for several hours. At the same time the pH of the reaction mixture is kept at about 6.1 to 6.9 by adding dropwise 3 n sodium hydroxide solution. Stirring and adjusting of the pH is continued until, on an average, each dyestuff molecule is provided with at least one dichloro-quinoxaline-carboxylic acid amide residue. The final step of the reaction can easily be detected from the amount of soda-lye consumed and from determination of free amino groups.

The 2,3-dichloro-quinoxaline-6-carboxylic acid can likewise be used in form of its solution in acetone.

When the reaction has finished the dyestuff solution is heated to 80° C. whereupon non-reacted 2,3-dichloro-quinoxaline-6-carboxylic acid chloride is saponified; the hydrolised product can be separated by filtration or in other separating means. The desired dyestuff is precipitated from the filtered dyestuff solution by adding 150 parts of common salt. It is then filtered with suction and dried in a vacuum or at atmospheric pressure at about 50° C. One obtains 195 to 200 g. of a product which still contains about 30% common salt. The salt can be removed by stirring the cooled dyestuff with 250 parts of water and again filtering it.

The dyestuff thus obtainable dyes cellulosic materials, particularly textiles of cotton and regenerated cellulose from a long bath in the presence of soda at 40 to 80° C., and according to the cold pad batch process or by the pad steam or pad dry heat fixing process at 140° C. turquoise shades which exhibit very good fastness to wet processing, to rubbing and to light.

The starting material used in this example can be obtained according to methods known as such, for instance by adding at 0 to 20° C. and at a pH of about 6.5 3 mols of 2,4-diaminobenzene sulfonic acid to an aqueous suspension of sulfonic acid group free copper phthalocyanine-trisulfonic acid chloride and simultaneously catalysing the condensation reaction with 3 mols of pyridine, whereupon the aforementioned mixture of the copper phthalocyanine sulfonamides is formed.

Similar reactive dyestuffs are obtainable if as a starting material a mixture is used which contains the two different copper phthalocyanine sulfonamide components in the ratio of 4:1. Such a mixture can be prepared from the corresponding copper phthalocyanine trisulfonic acid chloride and 2 mols of 2,4-diaminobenzene-sulfonic acid.

Instead of the given starting materials other starting compounds may be used such as those containing nickel as central atom instead of copper or the sulfonamides obtained by the afore-mentioned processes from copper phthalocyanine-4-trisulfonic acid-chloride or from phthalocyanine-3,4',4'',4'''-tetrasulfonic acid chloride or from phthalocyanine-4-tetrasulfonic acid chloride; similar dyes are also obtainable if as arylene diamine sulfonic acid toluylene-diamine-(2,4)-sulfonic acid-(5), 4,4'-diamino-dibenzyl-disulfonic acid-(2,2'), naphthylene diamine-(1,5)-disulfonic acid-(3,7) are employed. All those starting products and the methods for their preparation are known from literature. The condensation with 2,3-dichloro-quinoxaline-6-carboxylic acid chloride follows the above prescription.

Green reactive dyestuffs can be obtained if 2,3-dichloro-quinoxaline-6-carboxylic acid chloride is condensed with appropriate copper and nickel phthalocyanine intermediates such as the products obtained by polysulfochlorination of 3-tetra-(p-tolyl-mercapto)-copper phthalocyanine by means of chlorosulfonic acid, with 1,3-phenylene-diamine-4-sulfonic acid or 1,4-phenylene-diamine-3-sulfonic acid in such a ratio that about 1 to 2 sulfochloride groups are to react with 1 mol of the phenylene diamine compound, and finally hydrolising the remaining sulfochloride groups. In a similar manner simple or mixed amino and sulfo group-containing arylation or alkylation products of tri- or tetramercapto copper or nickel phthalocyanine can be acylated at the amino groups with 2,3-dichloro-quinoxaline-6-carboxylic acid chloride thus yielding valuable green reactive dyestuffs.

Example 273

If in the working method given in Example 240 33.6 parts of finely powdered N-methyl-N-(2,3-dichloroquinoxaline-6-carbonyl)-aminoacetylchloride are used instead of 26.5 parts of 2,3-dichloro-quinoxaline-5-carboxylic acid chloride, and adding the acid chloride to the aqueous solution of the sodium salt of 1-amino-8-hydroxynaphthalene-3,6-disulfonic acid, performing the acylation, coupling the reaction product with diazotised 2-aminobenzene-sulfonic acid, salting out, filtering and drying as indicated in Example 240, the dyestuff which in the free acid state corresponds to the formula

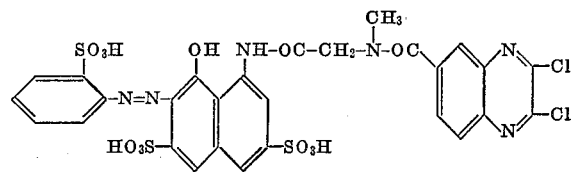

is obtained. It dyes cellulosic fibres, synthetic polyamides and wool according to the preceding instructions bluish red shades of good fastness to wet processing, to rubbing and to light.

Example 274

71.2 parts of a dyestuff which was obtained by coupling tetrazotised 4,4′ - diamino-3,3′-dimethyl-diphenyl-6,6′-disulfonic acid on the one side with 1-hydroxynaphthalene-4-sulfonic acid and on the other side with phenol are dissolved at pH 7 in 200 to 300 parts of water and treated with 30 parts of finely powdered 2,3-dichloroquinoxaline-6-sulfonic acid chloride. The mixture is thoroughly agitated and the pH value kept at 9 to 7 by continuous addition of a total of 5.5 parts of soda. If a sample of the dyestuff solution shows no longer a strong color change when soda solution and acetic acid is added, the formed reactive dyestuff of the formula

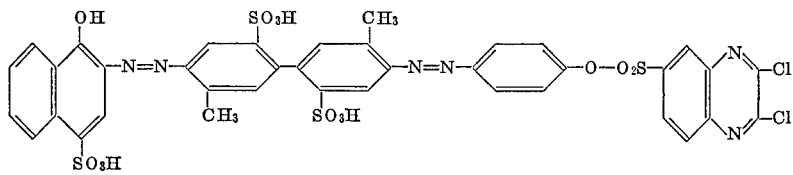

is salted out, filtered and dried in a vacuum at 40 to 50° C. The dyestuff dyes wool from weakly acid to neutral bath scarlet shades which are fast to wet processing and to light.

According to the method given in Example 257 the following dyestuffs are obtainable from the appropriate starting materials and/or after sulfonation of the condensation products:

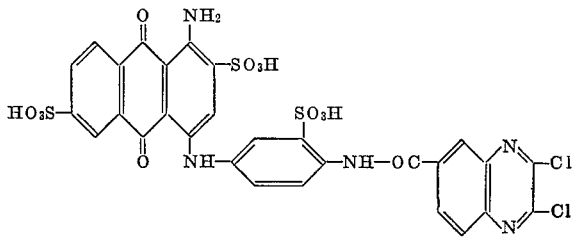

and

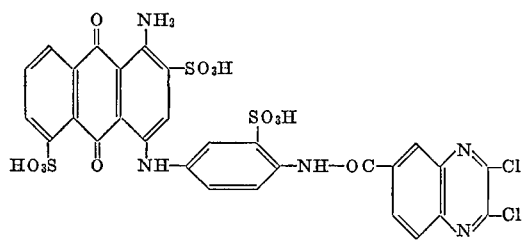

What we claim is:
1. A dyestuff of the formula

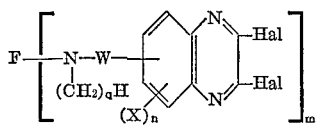

wherein F is the radical of a phthalocyanine dyestuff; $q$ is a whole number from 0 to 4; $m$ is a number from 1 to 8; $n$ is an integer from 1 to 3; Hal is a halogen atom having an atomic number from 17 to 35; W is a member selected from the group consisting of

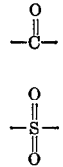

and $$-\overset{O}{\underset{\underset{O}{\|}}{S}}-$$

and X is a member selected from the group consisting of hydrogen, lower alkyl, —SO₃H, —COOH, chloro, bromo, nitro, hydroxy, lower alkoxy, cyano, —SO₂NH₂, lower alkyl sulfonamido, carbo lower alkoxy and lower alkyl sulfonic acid ester.

2. A dyestuff of claim 1 wherein F is the radical of a sulfo group-containing copper phthalocyanine dyestuff.
3. A dyestuff of claim 1 wherein F is the radical of a sulfo group-containing nickel phthalocyanine dyestuff.
4. A dyestuff of claim 10 wherein $m$ is a number ranging from 1 to 2.5.
5. A dyestuff according to claim 1 wherein $q$ is zero, W is

$m$ is a number from 1 to 4, X is hydrogen and Hal is chlorine.

6. A dyestuff according to claim 1 wherein W is

7. A dyestuff according to claim 1 wherein W is —SO₂—, $q$ is zero, $m$ is a number from 1 to 4, X is hydrogen and Hal is chlorine.
8. A dyestuff according to claim 1 wherein W is —SO₂—.
9. A dyestuff according to claim 1 wherein in the free acid state corresponds to a mixture of 1 mol of

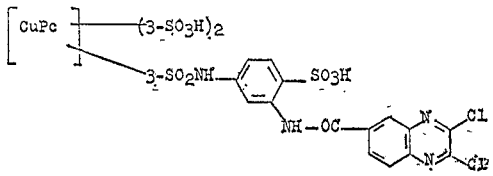

and 1 mol of

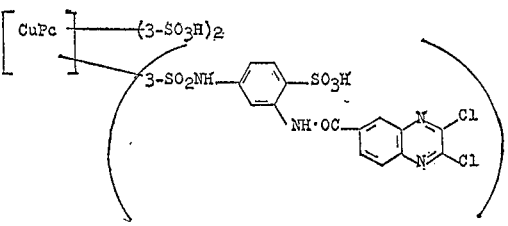

10. A dyestuff of the formula

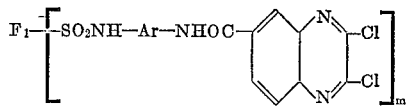

wherein F₁ is a sulfo copper phthalocyanine radical, Ar is a benzene radical and $m$ is a number ranging from 1 to 4.

References Cited
UNITED STATES PATENTS
3,375,241   3/1968   Siegel et al. _____ 260—250

NICHOLAS S. RIZZO, Primary Examiner

U.S. Cl. X.R.

8—41, 42, 43, 54, 54.2

PO-1050
(5/69)

UNITED STATES PATENT OFFICE
CERTIFICATE OF CORRECTION

Patent No. 3,522,246          Dated July 28, 1970

Inventor(s) Edgar Siegel and Klaus Sasse

It is certified that error appears in the above-identified patent and that said Letters Patent are hereby corrected as shown below:

Column 30, claim 9, that portion of the second formula reading

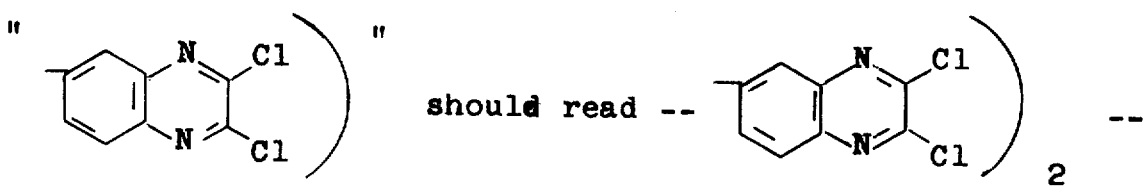

Column 30, claim 10, that portion of the formula reading

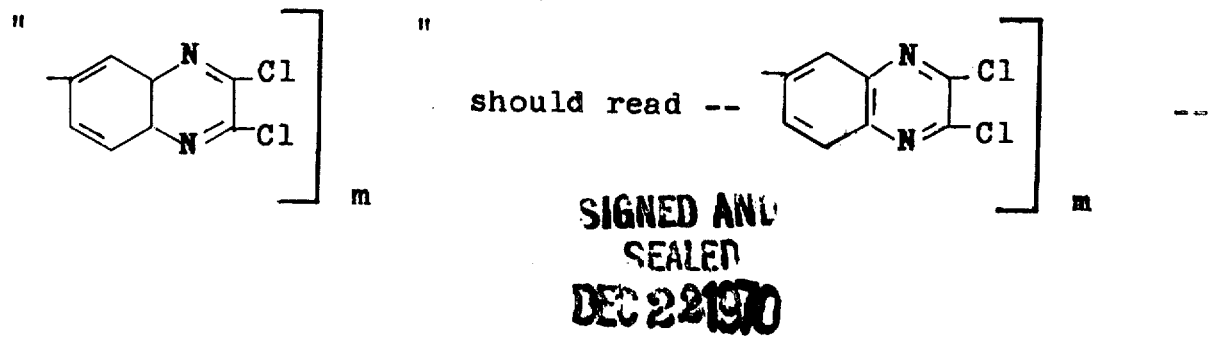

SIGNED AND
SEALED
DEC 22 1970

(SEAL)
Attest:

Edward M. Fletcher, Jr.
Attesting Officer

WILLIAM E. SCHUYLER, JR.
Commissioner of Patents